US012709713B2

(12) United States Patent
Yuan et al.

(10) Patent No.: US 12,709,713 B2
(45) Date of Patent: Aug. 18, 2026

(54) TREATMENT METHOD AND DEVICE FOR WASTE PLASTIC

(71) Applicant: PetroChina Company Limited, Beijing (CN)

(72) Inventors: Xiaoliang Yuan, Beijing (CN); Junwei Lei, Beijing (CN); Yuandong Hou, Beijing (CN); Pei Wu, Beijing (CN); Zhanquan Zhang, Beijing (CN); Yue Wang, Beijing (CN); Yan Wang, Beijing (CN); Ran Zhang, Beijing (CN); Bin Xie, Beijing (CN); Fei Chen, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 173 days.

(21) Appl. No.: 18/884,581

(22) Filed: Sep. 13, 2024

(65) Prior Publication Data

US 2025/0002797 A1 Jan. 2, 2025

Related U.S. Application Data

(63) Continuation of application No. PCT/CN2023/127357, filed on Oct. 27, 2023.

(30) Foreign Application Priority Data

Dec. 29, 2022 (CN) ......................... 202211703167.5
Dec. 29, 2022 (CN) ......................... 202211703185.3
Dec. 29, 2022 (CN) ......................... 202211708715.3

(51) Int. Cl.
*C10G 69/04* (2006.01)
*B01D 53/14* (2006.01)
(Continued)

(52) U.S. Cl.
CPC ......... *C10G 69/04* (2013.01); *B01D 53/1456* (2013.01); *B01J 6/008* (2013.01);
(Continued)

(58) Field of Classification Search
CPC ............ C10G 69/04; C10G 2300/1003; C10G 2400/02; C10G 2400/04; B09B 3/40;
(Continued)

(56) References Cited

U.S. PATENT DOCUMENTS 5,608,136 A 3/1997 Maezawa et al.
11,542,438 B1 * 1/2023 Choi ..................... C10G 1/065
(Continued)

FOREIGN PATENT DOCUMENTS

CN 1434100 A 8/2003
CN 2649590 Y 10/2004
(Continued)

OTHER PUBLICATIONS

International Search Report issued in related PCT Application No. PCT/CN2023/127357, mailed on Dec. 20, 2023, in 14 pages.
(Continued)

*Primary Examiner* — Kyle Armstrong
(74) *Attorney, Agent, or Firm* — Davis Wright Tremaine LLP

(57) ABSTRACT

The present application provides a treatment method and device for a waste plastic. A first aspect of the present application provides a treatment method for a waste plastic, including: firstly subjecting the waste plastic to a first pre-treatment to remove impurity and grease on a surface of the waste plastic, then subjecting the waste plastics to a second pre-treatment to convert a solid waste plastic into one in flow state; and finally, subjecting the waste plastic in flow state to a first cracking treatment and a second cracking treatment in sequence. Through the method provided in the
(Continued)

present application, while cracking the waste plastic, chlorine element in the waste plastic may be removed by a multi-stage adsorption, which reduces chlorine content in the cracked oil, reduces pressure and burden in subsequent refining, and meets the limitation of the chlorine content in cracked products in downstream processes.

20 Claims, 2 Drawing Sheets

(51) Int. Cl.
*B01J 6/00* (2006.01)
*B01J 20/04* (2006.01)
*B01J 20/28* (2006.01)
*B09B 3/40* (2022.01)
*B09B 101/77* (2022.01)

(52) U.S. Cl.
CPC ....... *B01J 20/041* (2013.01); *B01J 20/28026* (2013.01); *B09B 3/40* (2022.01); *B01D 2257/2045* (2013.01); *B01D 2258/02* (2013.01); *B09B 2101/77* (2022.01); *C10G 2300/1003* (2013.01); *C10G 2400/02* (2013.01); *C10G 2400/04* (2013.01)

(58) Field of Classification Search
CPC ............ B09B 2102/77; B01D 53/1456; B01D 2257/2045; B01D 2258/02; B01J 6/008; B01J 20/041
See application file for complete search history.

(56) References Cited

U.S. PATENT DOCUMENTS

2007/0173673 A1 7/2007 Fujimoto et al.
2024/0218257 A1 * 7/2024 Schucker ................ B01J 29/40

FOREIGN PATENT DOCUMENTS

| | | | | |
|---|---|---|---|---|
| CN | 1200075 | C | 5/2005 | |
| CN | 101050373 | A | 10/2007 | |
| CN | 102061007 | B | 4/2012 | |
| CN | 107201243 | A | 9/2017 | |
| CN | 107434979 | A | 12/2017 | |
| CN | 107746722 | A | 3/2018 | |
| CN | 108517223 | A | 9/2018 | |
| CN | 111100684 | A | 5/2020 | |
| CN | 111171865 | A | 5/2020 | |
| CN | 111778046 | A | 10/2020 | |
| CN | 214390090 | U | 10/2021 | |
| CN | 114106865 | A | 3/2022 | |
| CN | 114456470 | A | 5/2022 | |
| CN | 114479900 | A | 5/2022 | |
| CN | 114507542 | A | 5/2022 | |
| CN | 115141645 | A | 10/2022 | |
| JP | H0985046 | A | 3/1997 | |
| JP | H1190387 | A | 4/1999 | |
| JP | 2000129031 | A | 5/2000 | |
| JP | 2007154059 | A | 6/2007 | |
| WO | WO-2022099321 | A1 * | 5/2022 | ............ C10G 1/086 |

OTHER PUBLICATIONS

The State Intellectual Property Office of People's Republic of China, "First Office Action" in Application No. 202211703167.5, Aug. 16, 2025, 14 pages.

* cited by examiner

TREATMENT METHOD AND DEVICE FOR WASTE PLASTIC

CROSS-REFERENCE TO RELATED APPLICATIONS

This application is a continuation of International Application No. PCT/CN2023/127357, filed on Oct. 27, 2023, which claims priority to Chinese Patent Application No. 202211708715.3 filed with the China National Intellectual Property Administration on Dec. 29, 2022 and entitled “TREATMENT METHOD AND DEVICE FOR WASTE PLASTIC,” Chinese Patent Application No. 202211703185.3 filed with the China National Intellectual Property Administration on Dec. 29, 2022 and entitled “METHOD AND DEVICE FOR CONTINUOUSLY TREATING WASTE PLASTIC,” and Chinese Patent Application No. 202211703167.5 filed with the China National Intellectual Property Administration on Dec. 29, 2022, entitled “TREATMENT METHOD AND DEVICE FOR WASTE PLASTIC AND HEAVY OIL.” The contents of the aforementioned applications are hereby incorporated by reference in their entireties.

TECHNICAL FIELD

The present application relates to a treatment method and a device for a waste plastic, relating to the technical field of waste plastic processing and utilization.

BACKGROUND

Waste plastic refers to plastic that has been used in civil and industrial fields and eventually eliminated or replaced. Improper treatment of waste plastic will cause serious white pollution. At present, the treatment methods for waste plastic include physical recycling, chemical recycling and energy recycling. The physical recycling is also called mechanical recycling, in which waste plastics are generally sorted, crushed and shaped to reproduce a plastic product, this method, however, requires high sorting precision of raw materials, and the quality of the reproduced plastic products is poor and the number of recycling is limited. The energy recycling is to recover heat by incineration, but during the incineration process, a large number of harmful gases are generated, resulting in secondary pollution. The chemical recycling is to convert the organic ingredients in waste plastics into small molecular hydrocarbons through cracking or gasification technology. The chemical recycling has the following advantages: 1) chemical recycling can treat waste plastics that have been mixed, contaminated or physically regenerated multiple times, with a wide selection range of raw materials; 2) chemically recycled plastics have comparable quality to “primary plastics” produced from fossil raw materials and may be applied in medical, food and other fields that require higher quality, hygiene, and performance; 3) chemical recycling may convert waste plastics into chemical raw materials, which then produce plastics again, realizing true recycling; and 4) chemical recycling has reduced carbon emission compared with the energy recycling, and thus chemical recycling is one of the methods for recycling and treating waste plastics.

Cracking of waste plastics refers to that the waste plastics are used as raw materials and subjected to high-temperature pyrolysis or catalytic cracking to obtain cracked oil, and after refining, the cracked oil may be used to produce clean fuels or chemical raw materials to realize the recycling of waste plastics. The raw materials for chemical recycling treatment are mainly mixed wastes that cannot be physically recycled or have been physically recycled for many times, which have complex composition, diversified sources and contain a large amount of dirt and impurities, and these impurities have a significant impact on the cracking process and the quality of the cracked oils.

With the widespread application of polyvinyl chloride and the use of chlorine-containing modifiers in plastic processing, waste plastics inevitably contain chlorine element, which generates a large amount of chlorinated hydrocarbons during the cracking process, which may cause equipment corrosion, catalyst poisoning, ammonium chloride blockage and other issues in downstream units. Therefore, it is necessary to remove the chlorine generated during the cracking process of waste plastics and control the chlorine content in cracked products within a certain range.

SUMMARY

The present application provides a treatment method for a waste plastic, to reduce the chlorine content in the cracked product of the waste plastic, reducing the pressure and burden in subsequent refining, and meeting the limitations of the chlorine content in cracked products in downstream processes.

The present application further provides a treatment device for a waste plastic, which is used for realizing the above treatment method.

A first aspect of the present application provides a treatment method for a waste plastic, which is carried out using a first pre-treatment unit, a second pre-treatment unit, a first cracking unit and a second cracking unit, where the second pre-treatment unit, the first cracking unit and the second cracking unit are sequentially communicated, the first cracking unit includes a gas input port and a gas output port, and the second cracking unit is loaded with a dechlorination agent, and the treatment method includes the following steps:

- inputting the waste plastic into the first pre-treatment unit for a first pre-treatment to remove impurity and grease on a surface of the waste plastic, and inputting the waste plastic after the first pre-treatment into the second pre-treatment unit for a second pre-treatment to obtain a first material in flow state;
- inputting the first material into the first cracking unit for a first cracking treatment, the first cracking treatment being performed under anaerobic condition, inputting a protective gas into the first cracking unit through the gas input port to purge the first material, and discharging gas during the first cracking treatment through the gas output port, where the first cracking unit has a temperature of 220-380° C., and at least includes two temperature zones, a temperature of one temperature zone near a material input port side is lower than a temperature of another temperature zone near a material output port side, and a temperature difference between two adjacent temperature zones is not less than 20° C.; and
- inputting a second material output from the first cracking unit into the second cracking unit for a second cracking treatment, to obtain a treated product, where the second cracking unit has a temperature of 450-600° C.

The method provided in the present application uses a continuous reactor to sequentially perform a second pre-treatment and two-stage cracking treatment on the waste plastic, which helps to reduce operational difficulty and improve stability compared with a kettle-type batch reactor. In the specific treating process, firstly, the waste plastic is input into the first pre-treatment unit for the first pre-treatment to remove impurity and grease on the surface of the waste plastic; secondly, the waste plastic after the first pre-treatment is input to the second pre-treatment unit for the second pre-treatment to obtain the first material in flow state; and finally, the first material is subjected to the first cracking treatment and the second cracking treatment in sequence. During the first cracking treatment process, the chlorine-containing compound in the first material are controlled to be gradually decomposed by partitioned temperature rise, and protective gas purge is used to prevent the decomposed chlorine gas from recombining with the cracked product to generate organic chlorides again. The second cracking treatment mainly involves deep cracking of the first material. At the same time, no gas vent is provided to discharge the gas-phase mixture, so that the light oil generated by cracking will not be carried out into subsequent fractionation. In addition, the second cracking treatment is carried out under a dechlorination agent, which helps to achieve adsorption and removal of HCl and organic chlorine. Therefore, through the method provided in the present application, while cracking the waste plastic, the chlorine content in the cracked oil is reduced through a multi-stage dechlorination process of low-temperature segmented cracking and high-temperature adsorption dechlorination, which reduces the pressure and burden in subsequent refining, and meet the limitation of the chlorine content of the cracked product in downstream process.

In a specific embodiment, the second pre-treatment unit is an extrusion unit, which includes a first input port, a first output port and an exhaust port, and the first cracking unit and the second cracking unit may be independent reaction units or different zones in the same reaction unit, where the first cracking unit includes a gas input port and a gas output port, and the second cracking unit is loaded with a dechlorination agent. The treatment process is described in detail as follows.

Step 1. Inputting the waste plastic into the first pre-treatment unit for a first pre-treatment to remove impurity and grease on surface of the waste plastic; and inputting the waste plastic after the first pre-treatment into the second pre-treatment unit for a second pre-treatment to obtain a first material in flow state.

The waste plastic includes bags and barrels used in the chemical industry, containers in the textile industry, packaging materials in household appliance industry, building materials and pipes in construction industry, shrink films in canning industry, packaging bags in food processing, mulching films in agriculture, and automobile decomposition materials, or may be household garbages, etc. The main ingredient of the waste plastic includes one or two of polypropylene (PP) and polyethylene (PE), and may also include polyvinyl chloride (PVC). However, considering the quality and processing needs of the cracked product of waste plastic, the PVC content in waste plastic is not higher than 20%. Further, the PVC content is not higher than 10%, such as 1%, 2%, 3%, 5%, 8%, 10%.

Firstly, the waste plastic is subjected to the first pre-treatment, which includes crushing treatment and washing treatment. Specifically, conventional crushers may be used to crush the waste plastic into 20-50 mm plastic sheets or particles; and the washing treatment may be carried out by water in a sedimentation tank to remove mud, metal impurity and grease attached to the surface of the waste plastic. Specifically, a mass ratio of the waste plastic to water is 1:10 to 10:1. The washed waste plastic is filtered and dried, and the moisture content of the dried waste plastic is controlled below 3%.

Secondly, the waste plastic after the first pre-treatment is input into the second pre-treatment unit for the second pre-treatment. The input process may be automatic or manual, that is, the first pre-treatment unit and the second pre-treatment unit are communicated or not communicated with each other, which is not limited in the present application. The second pre-treatment unit is an extrusion unit, specifically a high-temperature extruder with an exhaust port. The high-temperature extruder is provided with a first input port, so that the waste plastic after the first pre-treatment is input into the high-temperature extruder through the first input port, and melted into a flow state during the high-temperature extrusion process.

Further, the temperature of the extruder is controlled at 120-220° C. Specifically, the extruder may be divided into a feeding section, a compression section and a melting section. The temperature of the feeding section is controlled at 120-180° C., so that the waste plastic is fed into the extruder to be softened without causing adhesion to screw. The temperature of the compression section and the melting section is controlled at 180-220° C., so that all waste plastics are melted into a flow state. At the same time, at this temperature, it is ensured that the PVC in the waste plastic reaches a preliminary decomposition temperature and part of PVC is decomposed. The screw rotational speed of the extruder may be adjusted according to a space velocity of subsequent cracking reaction.

When the waste plastic includes PVC, the PVC would preliminarily decompose and release HCl during the extrusion process. Therefore, the extrusion unit is provided with an exhaust port, and the gas generated during the extrusion process is discharged through the exhaust port.

In addition, in order to absorb the released HCl and avoid environmental pollution, the gas generated in the melting treatment process may be collected and absorbed into an absorption liquid, and the absorption liquid may be NaOH solution or a solution with pH≥7 such as lime milk.

Step 2. Inputting the first material output from the second pre-treatment unit into the first cracking unit for a first cracking treatment.

The extrusion unit is provided with a first output port, and the first material output from the extrusion unit through the first output port is input into the first cracking unit for the first cracking treatment in a continuous reaction mode. The first cracking unit may be a horizontal reaction furnace, and the temperature of the first cracking unit is controlled at 220-380° C., which is mainly used to decompose part of PVC in the waste plastic. Further, the temperature of the first cracking unit may be controlled at 250-350° C.

In the first cracking treatment process, in order to remove the HCl generated by cracking of the waste plastic, the first cracking treatment is carried out under the protective gas purging. Specifically, the first cracking unit includes a gas input port and a gas output port, and the protective gas is input into the first cracking unit through the gas input port to purge the first material, and the gas in the first cracking treatment process is discharged through the gas output port, so as to reduce the opportunity of the decomposed product recombining with HCl to generate organic chlorine, and also to avoid corrosion of the device caused by hydrochloric acid generated by a combination of HCl and water vapor. The protective gas may be $N_2$.

In order to absorb HCl released during the first cracking treatment and avoid environmental pollution, and the gas generated during the first cracking treatment may be input into an absorption liquid with a pH of ≥7.

In order to make the first material decompose slowly and to remove HCl in time under the protective gas purging, the first cracking unit includes at least two temperature zones, and the temperature zones are sequentially distributed from the material input port side of the first cracking unit to the material output port side thereof, a temperature of a temperature zone near the material input port side is lower than that of a temperature zone near the material output port side, and a temperature difference between two adjacent temperature zones is not less than 20° C. For example, from the material input port side to the material output port side, the first cracking unit includes a first temperature zone, a second temperature zone and a third temperature zone in total, where the first temperature zone has a temperature T1, the second temperature zone has a temperature T2, and the third temperature zone has a temperature T3, then 220° C.≤T1<T2<T3≤380° C., and T2−T1≥20° C., T3−T2≥20° C.

Step 3. Inputting a second material output from the first cracking unit into the second cracking unit for a second cracking treatment.

In a continuous reaction mode, the second material after the first cracking treatment is input into the second cracking unit for the second cracking treatment. The second cracking unit may be a horizontal reaction furnace, and the second cracking unit is controlled at a temperature of 450-600° C., maintains an anaerobic or anoxic environment, and is mainly used for cracking of PE, PP and other waste plastics. At the same time, there is also part of PVC that has not been completely decomposed. At this temperature, a small amount of HCl produced by cracking of PVC is easy to combine with the cracked product to generate organic chlorine. Therefore, the second cracking treatment is carried out in a dechlorination agent environment, which is helpful for the adsorption and removal of HCl, organic chlorine and other impurities such as silicon and iron.

Specifically, the dechlorination agent includes a carrier matrix and a metal oxide, the carrier matrix is one or more of alumina, activated carbon and molecular sieve, and the metal oxide is one or more of CuO, CaO, MgO and $Fe_2O_3$.

Further, a mass of the metal oxide is 1%-10% of a total mass of the dechlorination agent.

The dechlorination agent may be prepared according to a conventional technical means in the art.

After treatment in the second cracking unit, the treated product of waste plastic can be obtained, and the treated product may be fed into other unit to be processed or fractionated into different fractions for mixing with other fraction oils and for processing, which may be carried out according to a conventional technical means in the art and actual needs. For example, the treated product is subjected to gas-liquid separation, where a gas-phase ingredient is separated by condensation and deacidification to obtain low-carbon hydrocarbons, a liquid-phase ingredient is fed into a downstream refining process and is divided into gasoline fraction, diesel fraction, and heavy oil fraction and it may also be divided into finer fraction segments. Temperature intervals of the fraction segments are set according to needs.

In another specific embodiment, the second pre-treatment unit is a first mixing unit, in which a cracked tail oil in the fractionation products of the second cracking unit is used as a solvent to mix with the waste plastic after the first pre-treatment and then they are stirred and processed at a certain temperature, so that most of the waste plastic are dissolved in the cracked tail oil and the insoluble part are fully fused with the cracked tail oil under action of heating and stirring, so as to realize the stability and continuity of feeding of the waste plastic; and at the same time, the cracked tail oil may also be recycled.

Specifically, the second pre-treatment unit is the first mixing unit, and the first mixing unit includes a second input port, a third input port and a second output port, the second input port is used for inputting the waste plastic after the first pre-treatment, and the third input port is used for inputting the cracked tail oil. The first mixing unit is used to mix and dissolve the waste plastic after the first pre-treatment and the cracked tail oil, so that the waste plastic after the first pre-treatment is dissolved in the cracked tail oil to a flow state; the second input port is communicated with an input port of the first cracking unit; an output port of the second cracking unit is communicated with an input port of the gas-liquid separation unit, an output port of the gas-liquid separation unit is communicated with an input port of the fractionation unit, and at least one output port of the fractionation unit is communicated with the third input port.

In the process of treating, the waste plastic is subjected to a first pre-treatment according to the same method as in the previous embodiment, and the waste plastic after the first pre-treatment is input into the first mixing unit, the first cracking unit and the second cracking unit. The treated product obtained by the second cracking treatment is input into the gas-liquid separation unit for gas-liquid separation, to collect a liquid material. The liquid material is input into a fractionation unit for fractionating treatment. The cracked tail oil obtained by fractionation is returned to the first mixing unit through the third input port, to be mixed and dissolved with the waste plastic after the first pre-treatment, and then recycled as a solvent of waste plastic.

Further, a fractionation temperature of the cracked tail oil is 300-500° C., and further is 360-450° C.

In order to realize the dissolution of waste plastic in the cracked tail oil, the temperature of the first mixing unit is controlled at 120-220° C., and the mixing process is carried out under stirring, so that most of the waste plastic are dissolved in the cracked tail oil, and the insoluble part is fully fused with the cracked tail oil under action of heating and stirring, so as to realize the stability and continuity of the waste plastic feeding.

In addition to the tail oil fraction, a cracked oil of other fraction may be divided into gasoline and diesel or into finer fraction segments according to needs, which may be carried out according to a conventional technical means in the art and actual needs.

In the present embodiment, the first cracking unit and the second cracking unit are the same as those in the previous embodiment, and would not be repeated in the present application.

In another specific embodiment, the second pre-treatment unit is a second mixing unit, which uses a heavy oil to dissolve the waste plastic after the first pre-treatment. Specifically, the second pre-treatment unit is a second mixing unit, and the second mixing unit includes a fourth input port, a fifth input port and a third output port, where the fourth input port is used for inputting the waste plastic after the first pre-treatment, and the fifth input port is used for inputting the heavy oil. The second mixing unit is used to mix and dissolve the waste plastic after the first pre-treatment with the heavy oil, so that the waste plastic after the first pre-treatment is dissolved in the heavy oil to a flow state. The third input port is communicated with the input port of the first cracking unit.

Further, the heavy oil specifically includes one or more of residual oil fractions above 500° C., vacuum wax oil above 350° C., hydrocracked tail oil, and catalytic cracked heavy cycle oil. Furthermore, a mass ratio of the waste plastic to the heavy oil is (1:20) to (10:1).

The waste plastic after the first pre-treatment and the heavy oil are input to the second pre-treatment unit to be fully mixed, a temperature in the second pre-treatment unit is controlled at 120-220° C., and the mixing process is carried out under stirring, so that most of the waste plastic is dissolved in the heavy oil, and the insoluble part is fully fused with the heavy oil under action of heating and stirring to form a mixed first slurry.

Then, the mixed first slurry may be passed through the first cracking unit and the second cracking unit in sequence to undergo cracking treatment, and the specific treatment method is the same as that in the aforementioned embodiments. Furthermore, the treated product obtained after the treatment in the second cracking unit may also be fed into other unit for processing or fractionating into different fractions for mixing with other fraction oil and for processing, which may be carried out according to a conventional technical mean in the art and actual needs.

In summary, through the method provided in the present application, while cracking the waste plastic, chlorine element in the waste plastic may be removed by a multi-stage adsorption, so as to reduce chlorine content in the cracked oil, reduce the pressure and burden in subsequent refining, and meet the limitation of the chlorine content in the cracked product in downstream processes.

A second aspect of the present application provides a device for realizing any one of the above methods, and the device includes a first pre-treatment unit, a second pre-treatment unit, a first cracking unit, a second cracking unit and a heating unit, where:

the first pre-treatment unit is used for carrying out a first pre-treatment on a waste plastic to remove impurity and grease on surface of the waste plastic; the second pre-treatment unit includes an input port and an output port, the input port is used for inputting the waste plastic after treatment in the first pre-treatment, the output port is communicated with an input port of the first cracking unit, an output port of the first cracking unit is communicated with an input port of the second cracking unit, and an output port of the second cracking unit is used for outputting a treated product;

the first cracking unit is provided with a material conveyor, a gas input port and a gas output port, the material conveyor is used for conveying the material in the first cracking unit to the output port; the gas input port is used for conveying a protective gas into the first cracking unit, and the gas output port is used for discharging gas in the first cracking process;

the second cracking unit is provided with a dechlorination agent reservoir, in which a dechlorination agent is stored; and the heating unit is used for controlling the temperatures in the first cracking unit and the second cracking unit, and for achieving at least two temperature zones included in the first cracking unit.

In a specific embodiment, the second pre-treatment unit is an extrusion unit, specifically a high-temperature extruder with an exhaust port. FIG. 1 is a structural schematic diagram of a treatment device provided by an embodiment of the present application. The treatment device includes a first pre-treatment unit, an extrusion unit 11, a first cracking unit 21, a second cracking unit 22 and a heating unit. Each unit is described in detail below.

The first pre-treatment unit is used for the first pre-treatment of waste plastic. Specifically, the first pre-treatment unit includes a crushing unit and a washing unit, which are used for crushing and washing the waste plastic respectively. The crushing unit is specifically a crusher, and the cleaning unit may be a sedimentation tank.

The extrusion unit 11 includes a first input port and a first output port. The waste plastic treated by the first pre-treatment unit is fed into the extrusion unit 11 through the first input port. It can be understood that the output port of the first pre-treatment unit may be communicated with the first input port of the extrusion unit 11, so that the waste plastic after the first pre-treatment may be directly fed into the extrusion unit 11, or it may also be set separately that the waste plastic after treatment by the first pre-treatment unit is transported manually or by a machine to the extrusion unit 11 for extrusion treatment.

The extrusion unit 11 further includes an exhaust port for discharging the gas generated during the extrusion process. In addition, in order to absorb the released HCl and avoid environmental pollution, the device further includes an absorption unit, which is communicated with the exhaust port of the extrusion unit 11 to absorb the HCl discharged from the extrusion unit.

The first output port of the extrusion unit 11 is communicated with a material input port of the first cracking unit 21, and a material output port of the first cracking unit 21 is communicated with a material input port of the second cracking unit 22, so that a first material after extrusion treatment is continuously cracked through the first cracking unit 21 and the second cracking unit 22. FIG. 4 is a structural schematic diagram of a first cracking unit and a second cracking unit provided by an embodiment of the present application, and FIG. 5 is a structural schematic diagram of a first cracking unit and a second cracking unit provided by another embodiment of the present application. As shown in FIG. 4 to FIG. 5, the first cracking unit 21 and the second cracking unit 22 may be two independent cracking units or two zones within one cracking unit. The first cracking unit 21 and the second cracking unit 22 may be horizontal reaction furnaces.

Since the first material fed into the first cracking unit 21 is in a form of viscous paste, the first cracking unit 21 is provided with a material conveyor 212, which is used for conveying the material in the first cracking unit 21 to the material output port. The material conveyor 212 may be a propeller to push the material forward along the propeller at a certain speed and to be output from the output port.

The heating unit is used for controlling the temperature in the first cracking unit 21 and realizing at least two temperature zones included in the first cracking unit 21. For example, continuing to refer to FIG. 4, the first cracking unit 21 is heated by the heating unit and the first cracking unit 21 is made to include three temperature zones, where a temperature of the first temperature zone is T1, a temperature of the second temperature zone is T2, and a temperature of the third temperature zone is T3. The temperature requirements of the three temperature zones are as mentioned above.

In order to discharge the HCl generated by PVC cracking, the first cracking unit 21 is provided with a gas input port 213 and a gas output port 214. The gas input port 213 is used for conveying a protective gas to the first cracking unit 21, and the gas output port 214 is used for discharging the gas in the first cracking process.

The gas output port 214 of the first cracking unit may also be communicated with an absorption unit, and the absorption unit stores an absorption liquid for absorbing the gas discharged from the exhaust port of the extrusion unit and the gas output port 214.

The material output port of the first cracking unit 21 is communicated with the material input port of the second cracking unit 22. The second cracking unit 22 is internally provided with a dechlorination agent reservoir 221, whose axial direction is overlapped with an axial direction of the second cracking unit 22, and a certain rotation speed of the propeller is maintained, so that the materials in the second cracking unit 22 may be pushed to move towards the material output port.

A dechlorination agent is stored in the dechlorination agent reservoir 221, and the dechlorination agent may adsorb and remove HCl and organic chlorine generated in the second cracking process.

Further, an inner diameter of the dechlorination agent reservoir 221 is D1, and an inner diameter of the second cracking unit 22 is D2, with $\frac{1}{2} \leq D1/D2 \leq \frac{2}{3}$. On the basis of realizing a combination of the dechlorination agent with HCl gas and organic chlorine, the coking of waste plastic to block the dechlorination agent reservoir is avoided.

In addition, the second cracking unit 22 is further provided with a cleaner 222 and a waste output port 223, and the cleaner 222 is arranged on an inner wall of the second cracking unit 22, and the waste output port 223 is arranged on a bottom wall of the second cracking unit 22 close to the output port and is used for discharging the waste residue generated in the second cracking process. The cleaner 222 may specifically be a scraper to remove the residue remaining in the second cracking unit 22 and discharge it through the waste output port 223. Generally, the residue is discharged once every 5-10 h.

The above device further includes a gas-liquid separation unit. An input port of the gas-liquid separation unit is communicated with the output port of the second cracking unit to perform gas-liquid separation on the treated product output from the second cracking unit 22. A gas-phase output from the gas-liquid separation unit may be condensed and deacidified to separate out low-carbon hydrocarbons. A liquid-phase may be fractionated, for example, it may be fractionated into gasoline fraction, diesel fraction, and heavy oil fraction, and it may also be fractionated into finer fraction segments, which is not further limited in the present application.

In another specific embodiment, the second pretreatment unit is a first mixing unit, and the device further includes a gas-liquid separation unit and a fractionation unit. FIG. 2 is a structural schematic diagram of a device provided by another embodiment of the present application. As shown in FIG. 2, the device includes a first pre-treatment unit, a first mixing unit 12, a first cracking unit 21, a second cracking unit 22, a gas-liquid separation unit 3, a fractionation unit 4 and a heating unit. The first pre-treatment unit may be communicated or not communicated with the first mixing unit 12. The first mixing unit 12, the first cracking unit 21, the second cracking unit 22, the gas-liquid separation unit 3 and the fractionation unit 4 are sequentially communicated, and at least one output port of the fractionation unit 4 is communicated with at least one input port of the first mixing unit 12. The details are as follows.

The first mixing unit 12 includes a second input port and a third input port. The second input port is used for inputting the waste plastic after being treated by the first pre-treatment unit, and the third input port is communicated with at least one output port of the fractionation unit 4, and is used for inputting the cracked tail oil obtained by fractionation, so that the waste plastic after the first pre-treatment may be mixed with the cracked tail oil.

Further, the heating unit is connected to the first mixing unit 12 to control the temperature in the first mixing unit 12 to be 120-220° C. The first mixing unit 12 is provided with a stirrer to stir the waste plastic and the cracked tail oil, so that most of the waste plastic is dissolved in the cracked tail oil to form a first material.

A second output port of the first mixing unit 12 is communicated with an input port of the first cracking unit 21, and an output port of the first cracking unit 21 is communicated with an input port of the second cracking unit 22, so that the first material output from the first mixing unit 12 is continuously cracked through the first cracking unit 21 and the second cracking unit 22. The first cracking unit 21 and the second cracking unit 22 are the same as the aforementioned embodiments, and the description thereof is not repeated here.

An output port of the second cracking unit 22 is communicated with an input port of the gas-liquid separation unit 3 to perform gas-liquid separation on the treated product output from the second cracking unit, to obtain a gas material cracked gas and a liquid material cracked oil, respectively.

A liquid-phase output port of the gas-liquid separation unit 3 is communicated with an input port of the fractionation unit 4, so as to fractionate fractions of the liquid material cracked oil into at least two different segmented products including cracked tail oil. According to different fraction segmented products, the fractionation unit 4 includes at least one output port, and at least one output port is communicated with a third input port of the first mixing unit 12 to return the cracked tail oil obtained by fractionation to the first mixing unit 12 for recycling.

The gas-liquid separation unit 3 and the fractionation unit 4 may be arranged according to conventional technical means in the art, for example, the fractionation temperature and the number of the output port may be set according to the fraction to be fractionated.

In another specific embodiment, the second pre-treatment unit is a second mixing unit 13. FIG. 3 is a structural schematic diagram of a device provided by an embodiment of the present application. As shown in FIG. 3, the device includes a first pre-treatment unit, a second mixing unit 13, a first cracking unit 21, a second cracking unit 22, and a heating unit. The second mixing unit 13, the first cracking unit 21, and the second cracking unit 22 are sequentially communicated. The second mixing unit 13 includes a fourth input port and a fifth input port, the fourth input port is used for inputting the waste plastic after the first pre-treatment, the fifth input port is used for inputting heavy oil, and the fifth input port may be arranged separately or communicated with other heavy oil processing unit.

The second mixing unit 13 is also connected to the heating unit and is internally provided with a stirrer. The heating unit is used for controlling the temperature in the second mixing unit 12 to be 120-220° C., and the stirrer is used to stir the waste plastic and heavy oil, so that most of the waste plastic is dissolved in the heavy oil to form a first slurry.

Both the first cracking unit 21 and the second cracking unit 22 are the same as those of the above embodiments. Moreover, persons skilled in the art may connect a gas-liquid separation unit and a fractionation unit at an output port of the second cracking unit 22 according to actual needs so as to perform gas-liquid separation on the treated product output from the second cracking unit 22. A gas-phase output from the gas-liquid separation unit may be condensed and deacidified to separate out low-carbon hydrocarbons. The liquid-phase may be fractionated, for example, it can be fractionated into gasoline fraction, diesel fraction, and heavy oil fraction, and it may also be fractionated into finer fraction segments, which is not further limited in the present application.

In conclusion, the device provided by the present application may be used for treating waste plastics, to reduce the chlorine content in the cracked product of waste plastic, reduce the pressure and burden in subsequent refining, and meet the limitation of the chlorine content in the cracked product in downstream processes.

BRIEF DESCRIPTION OF DRAWINGS

In order to illustrate the technical solutions in the embodiments of the present application or in the prior art more clearly, the drawings required in the description of the embodiments or in the prior art will be briefly introduced below. Obviously, the drawings in the following description are only some embodiments of the present application. For the person skilled in the art, other drawings may also be obtained based on these drawings without creative work.

DESCRIPTION OF REFERENCE SIGNS

- 11—extrusion unit;
- 12—first mixing unit;
- 13—second mixing unit;
- 21—first cracking unit;
  - 212—material conveyor;
  - 213—gas input port;
  - 214—gas output port;
- 22—second cracking unit;
  - 221—dechlorination agent reservoir;
  - 222—cleaner;
  - 223—waste output port;
- 3—gas-liquid separation unit;
- 4—fractionation unit.

DESCRIPTION OF EMBODIMENTS

In order to make the purpose, technical solutions and advantages of the present application clearer, the technical solutions in embodiments of the present application will be clearly and completely described below in combination with the examples in the present application. Obviously, the described examples are some of the examples of the present application, but not all of them. Based on the examples in the present application, all other examples obtained by the person skilled in the art fall within the protection scope of the present application without creative work.

Example 1-1

The present example provides a treatment device for a waste plastic, including a first pre-treatment unit, an absorption unit, an extrusion unit, a first cracking unit, a second cracking unit, and a heating unit. The first pre-treatment unit is used to carry out a first pre-treatment on waste plastic, and the waste plastic after the first pre-treatment is input to the extrusion unit for extrusion treatment. The extruded material automatically and continuously is fed into the first cracking unit and the second cracking unit for cracking treatment. After the treatment is completed, a treated product is obtained.

The first pre-treatment unit includes a crusher and a sedimentation tank. The crusher is used to crush the waste plastic into plastic sheets or particles of 20-50 mm. The crushed waste plastic is fed into the sedimentation tank, which contains water. Under the action of gravity, mud and metal impurity on surface of the waste plastic is precipitated to the bottom of the sedimentation tank, and the grease on the upper layer is removed by a film-scraping mode.

The extrusion unit includes an extruder, the waste plastic after the first pre-treatment is input from a first input port of the extruder and extruded under the action of a screw. An exhaust port is arranged at an end of the extruder near outlet thereof to discharge the gas generated during the extrusion process. The exhaust port is connected to the absorption unit, and the absorption unit is provided with an absorption liquid inside thereof.

Figure 1:
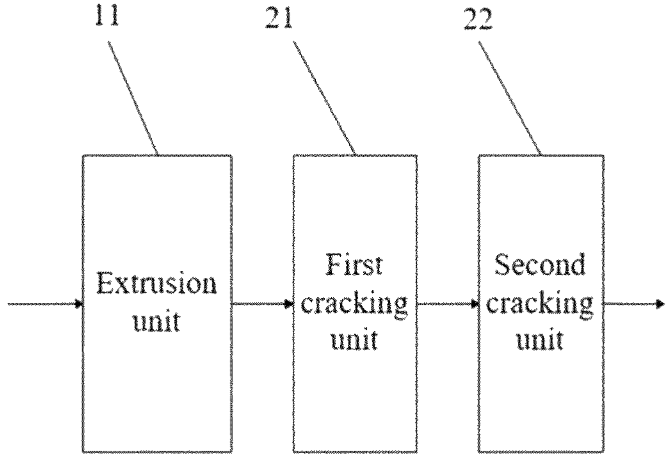
FIG. 1 is a structural schematic diagram of a treatment device provided by an embodiment of the present application.
Figure 2:
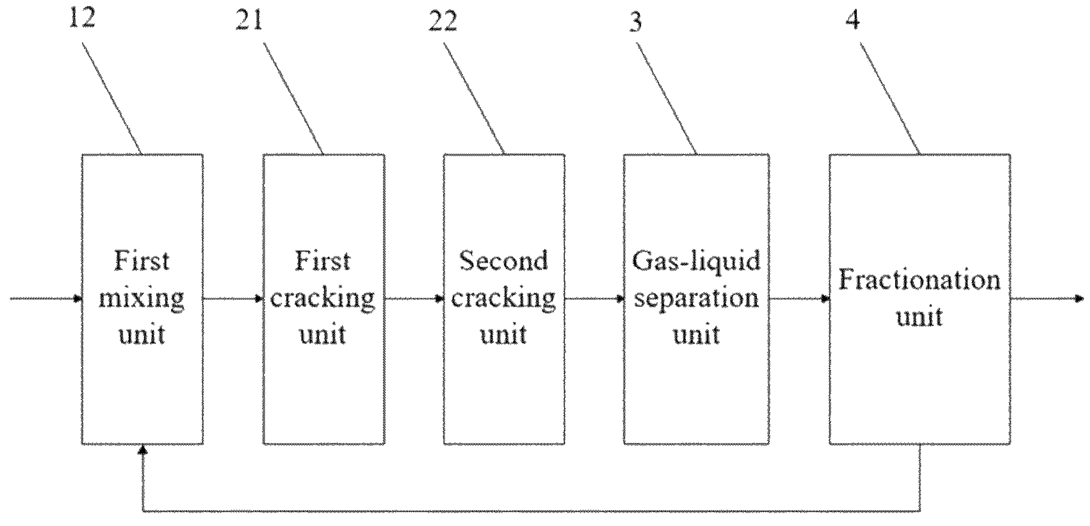
FIG. 2 is a structural schematic diagram of a treatment device provided by another embodiment of the present application.
Figure 3:
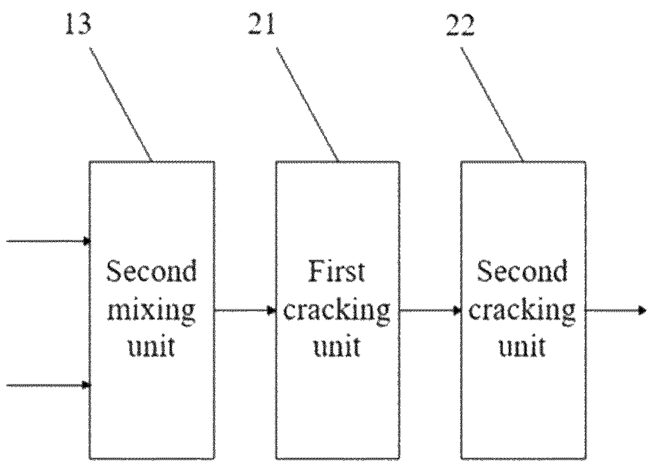
FIG. 3 is a structural schematic diagram of a treatment device provided by yet another embodiment of the present application.
Figure 4:
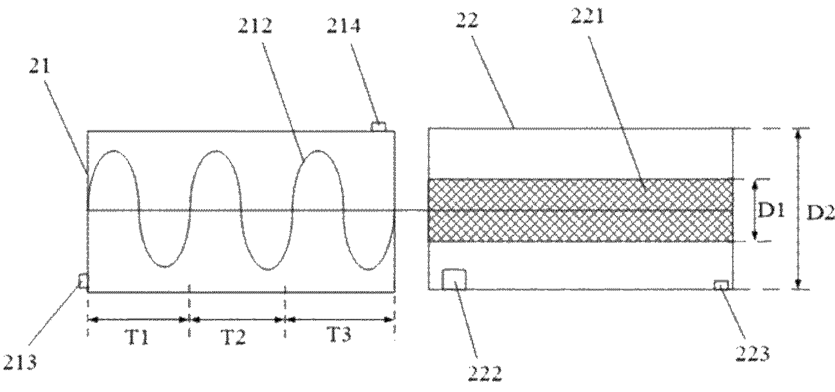
FIG. 4 is a structural schematic diagram of a first cracking unit and a second cracking unit provided by an embodiment of the present application.

The first cracking unit and the second cracking unit are shown in FIG. 4, and the first cracking unit is provided with a propeller to drive the material forward.

A bottom of the first cracking unit near its material input port is provided with a gas input port, and an upper part thereof near its material output port is provided with a gas output port. The gas input port is communicated with a nitrogen tank for continuously conveying nitrogen into the first cracking unit, and the gas output port is communicated with the absorption unit for collecting and absorbing the gas generated during the first cracking treatment process.

The second cracking unit is provided with a dechlorination agent reservoir, and a dechlorination agent is stored in the dechlorination agent reservoir. An inner diameter of the dechlorination agent reservoir is D1, and an inner diameter of the second cracking unit is D2, with D1/D2 being ½.

The second cracking unit is provided with a scraper and a waste output port. The scraper is used to remove residues left in the second cracking unit and discharge the residues through the waste output port.

An outlet of the second cracking unit is communicated with a gas-liquid separation tower for separation of cracked products.

The heating unit is used to control the temperature within the first and second cracking units.

Example 1-2

Figure 5:
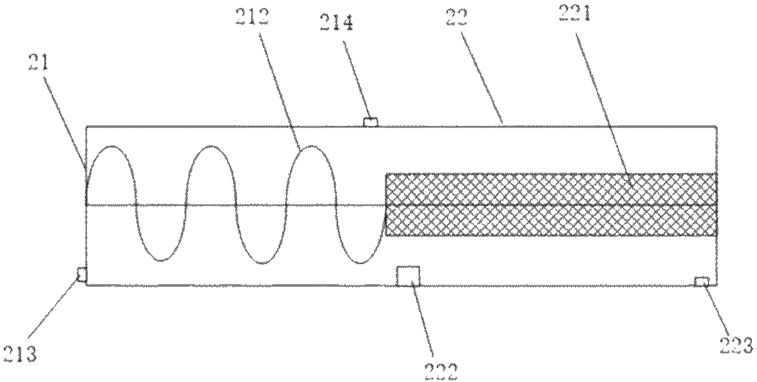
FIG. 5 is a structural schematic diagram of a first cracking unit and a second cracking unit provided by another embodiment of the present application.

The present example provides a treatment device for a waste plastic, which may be referred to Example 1-1, with difference that the cracking unit is shown in FIG. 5, i.e., the first cracking unit and the second cracking unit are two zones of a horizontal reacting furnace.

Example 1-3

The present example provides a treatment device for a waste plastic, which may be referred to Example 1-1, with difference that the first cracking unit includes three temperature zones, which are sequentially distributed and arranged along a direction from the material input port to the material output port of the first cracking unit.

Example 1-4

The present example provides a treatment device for a waste plastic, which may be referred to Example 1-1, with difference that the first cracking unit includes four temperature zones, which are sequentially distributed and arranged along a direction from the material input port to the material output port of the first cracking unit.

Example 1-5

The present example provides a treatment method for a waste plastic, using the device provided by Example 1-1. The treatment method specifically includes the following steps:

Mixing beverage bottles and disposable plastic bags from household waste to obtain waste plastics, where Cl content of the waste plastic is 3% as determined by a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 1.5%;

Inputting the dried waste plastic into an extruder for extrusion treatment, where a temperature of a feeding section is 130° C. and temperatures of compression and melting sections are controlled at 200° C., the gas discharged during extrusion process is fed into an absorption unit for absorption;

Inputting the material after extrusion treatment into a first cracking unit for a first cracking treatment, where the temperature is controlled at 250° C. through a heating unit, a feeding speed is 100 g/min, $N_2$ is continuously purged into the furnace through a gas input port in a $N_2$ flow rate of 50 ml/min, $N_2$ and the gas generated by the first cracking treatment are output by a gas output port and into an absorption unit for absorption;

Bringing the material after first cracking treatment into a second cracking unit for a second cracking treatment, where the temperature is controlled at 500° C., the second cracking treatment is performed in a dechlorination agent environment, the dechlorination agent is an alumina-activated carbon-CaO composite dechlorination agent with a CaO mass content of 10% and a loading amount of 200 g.

Bringing the treated product after the second cracking treatment into a gas-liquid separator and then collecting a cracked gas and a cracked oil, where a yield of the cracked gas is 13.9%, a total yield of the cracked oil is 66.7%, and a chlorine content in the cracked oil is 23 ppm; and fractionating the cracked oil to obtain gasoline fraction, diesel fraction and heavy oil fraction, whose yields (the yields of the gasoline fraction, the diesel fraction, and the heavy oil fraction refer to percentages they account for in the cracked oil) and distribution of distillation ranges are shown in Table 1-1.

TABLE 1-1

| | Yield/% | IBP (Initial Boiling Point) | 10% | 50% | 90% | FBP (Final Boiling Point) | Cl/ppm |
|---|---|---|---|---|---|---|---|
| Cracked oil | | 49 | 121 | 203 | 445 | 677 | 23 |
| <180° C. | 25.4% | 44 | 83 | 138 | 191 | 236 | 27 |
| 180° C.-360° C. | 49.2% | 185 | 221 | 249 | 339 | 394 | 19 |
| >360° C. | 25.4% | 249 | 390 | 452 | 566 | 682 | 21 |

Example 1-6

The present example provides a treatment method for a waste plastic, using the device provided by Example 1-1. The treating method specifically includes the following steps:

Using a mixed waste plastic from paper mill, where Cl content of the waste plastic is 6% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 2.3%;

Inputting the dried waste plastic into an extruder for extrusion treatment, where a temperature of a feeding section is 150° C., temperatures of compression and melting sections are controlled to 220° C., and the gas discharged during the extrusion process is fed into an absorption unit for absorption;

Inputting the material after extrusion treatment into a first cracking unit for a first cracking treatment, where a temperature of the furnace is controlled at 230° C. through a heating unit, a feeding speed is 120 g/min, and $N_2$ is continuously purged into the furnace through a gas input port in a $N_2$ flow rate of 60 ml/min, and $N_2$ and the gas generated by the first cracking treatment are output by a gas output port and into an absorption unit for absorption;

Bringing the material after first cracking treatment into a second cracking unit for a second cracking treatment, where the furnace is controlled at a temperature of 450° C., the second cracking treatment is performed in a dechlorination agent environment, and the dechlorination agent is the same as that of Example 1-5;

Bringing the treated product after the second cracking treatment into a gas-liquid separator and then collecting a cracked gas and a cracked oil, where a yield of the cracked gas is 15.3%, a total yield of the cracked oil is 59.2%, and chlorine content in the cracked oil is 48 ppm; and fractionating the cracked oil to obtain gasoline fraction, diesel fraction and heavy oil fraction, whose yields and distribution of distillation ranges are shown in Table 1-2.

TABLE 1-2

| | Yield/% | IBP | 10% | 50% | 90% | FBP | Cl/ppm |
|---|---|---|---|---|---|---|---|
| Cracked oil | | 61 | 132 | 255 | 462 | 623 | 48 |
| <180° C. | 19.6% | 62 | 145 | 162 | 177 | 199 | 53 |
| 180° C.-360° C. | 59.6% | 183 | 205 | 262 | 335 | 422 | 46 |
| >360° C. | 20.8% | 305 | 335 | 405 | 529 | 661 | 42 |

Example 1-7

The present example provides a treatment method for a waste plastic, using the device provided by Example 1-3. The treating method specifically includes the following steps:

Using a mixed waste plastic from paper mill, where Cl content of the waste plastic is 6.2% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 2.6%;

Inputting the dried waste plastic into an extruder for extrusion treatment, where a temperature of a feeding section is 180° C., temperatures of compression and melting sections are controlled to 220° C., and the gas discharged during the extrusion process is fed into an absorption unit for absorption;

Inputting the material after extrusion treatment into a first cracking unit for a first cracking treatment, where temperatures of a first temperature zone, a second temperature zone and a third temperature zone are controlled at 250° C., 300° C. and 350° C. respectively, a feeding speed is 150 g/min, $N_2$ is continuously purged into the furnace through a gas input port in a $N_2$ flow rate of 80 ml/min, and $N_2$ and the gas generated by the first cracking treatment are output by a gas output port and into an absorption unit for absorption;

Bringing the material after first cracking treatment into a second cracking unit for a second cracking treatment, where the furnace is controlled at a temperature of 550° C., the second cracking treatment is performed in a dechlorination agent environment, and the dechlorination agent is the same as that of Example 1-5.

Bringing the treated product after the second cracking treatment into a gas-liquid separator and then collecting a cracked gas and a cracked oil, where a yield of the cracked gas is 12.6%, a total yield of the cracked oil is 65.2%, and chlorine content in the cracked oil is 35 ppm; and fractionating the cracked oil to obtain gasoline fraction, diesel fraction and heavy oil fraction, whose yields and distribution of distillation ranges are shown in Table 1-3.

TABLE 1-3

| | Yield/% | IBP | 10% | 50% | 90% | FBP | Cl/ppm |
|---|---|---|---|---|---|---|---|
| Cracked oil | | 43 | 126 | 261 | 479 | 599 | 35 |
| <180° C. | 13.5% | 56 | 137 | 159 | 168 | 201 | 32 |
| 180° C.-360° C. | 66.3% | 169 | 192 | 288 | 345 | 383 | 34 |
| >360° C. | 20.2% | 362 | 396 | 443 | 533 | 658 | 42 |

Example 1-8

The present example provides a treatment method for a waste plastic, using the device provided by Example 1-1, where the temperature in the first cracking unit is set at 350° C., and all other conditions are the same as those of Example 1-7.

The yield of the collected cracked gas is 14.3%, the total yield of the collected cracked oil is 61.6%, and the chlorine content in the cracked oil is 44 ppm. The cracked oil is fractionated, to gasoline fraction, diesel fraction and heavy oil fraction, whose yields and the distribution of distillation ranges are shown in Table 1-4.

TABLE 1-4

| | Yield/% | IBP | 10% | 50% | 90% | FBP | Cl/ppm |
|---|---|---|---|---|---|---|---|
| Cracked oil | | 52 | 119 | 243 | 487 | 603 | 44 |
| <180° C. | 14.3% | 49 | 124 | 165 | 187 | 211 | 43 |
| 180° C.-360° C. | 61.6% | 182 | 213 | 289 | 350 | 383 | 46 |
| >360° C. | 24.1% | 349 | 379 | 432 | 526 | 621 | 45 |

Example 1-9

The present example provides a treatment method for a waste plastic, using the device provided by Example 1-2. The treating method specifically includes the following steps:

Using a mixed waste plastic from paper mill, where Cl content of the waste plastic is 6.0% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 1.9%;

Inputting the dried waste plastic into an extruder for extrusion treatment, where a temperature of a feeding section is 160° C., temperatures of compression and melting sections are controlled at 200° C., and the gas discharged during the extrusion process is fed into an absorption unit for absorption;

Inputting the material after extrusion treatment into a first cracking unit for a first cracking treatment, where a temperature is controlled at 350° C., a feeding speed is 150 g/min, $N_2$ is continuously purged into the furnace through a gas input port in a $N_2$ flow rate of 100 ml/min, and $N_2$ and the gas generated by the first cracking treatment are output by a gas output port and into an absorption unit for absorption;

Bringing the material after first cracking treatment into a second cracking unit for a second cracking treatment, where the furnace is controlled at a temperature of 550° C., and the second cracking treatment is performed in a dechlorination agent environment. The dechlorination agent is the same as that of Example 1-5;

Bringing the treated product into a gas-liquid separator and then collecting a cracked gas and a cracked oil, where a yield of the cracked gas is 14.9%, a total yield of the cracked oil is 58.3%, and chlorine content in the cracked oil is 49 ppm; and fractionating the cracked oil to obtain gasoline fraction, diesel fraction and heavy oil fraction, whose yields and distribution of distillation ranges are shown in Table 1-5.

TABLE 1-5

| | Yield/% | IBP | 10% | 50% | 90% | FBP | Cl/ppm |
|---|---|---|---|---|---|---|---|
| Cracked oil | | 58 | 123 | 262 | 489 | 601 | 49 |
| <180° C. | 22.0% | 53 | 139 | 156 | 169 | 211 | 48 |
| 180° C.-360° C. | 56.8% | 183 | 199 | 249 | 342 | 392 | 52 |
| >360° C. | 21.2% | 305 | 315 | 411 | 556 | 623 | 39 |

Example 1-10

The present example provides a treatment method for a waste plastic, using the device provided by Example 1-4. The treating method specifically includes the following steps:

Using a mixed waste plastic from paper mill, where Cl content of the waste plastic is 6.2% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 1.9%.

Inputting the dried waste plastic into an extruder for extrusion treatment, where a temperature of a feeding section is 160° C., temperatures of compression and melting sections are controlled at 200° C., and the gas discharged during the extrusion process is fed into an absorption unit for absorption.

Inputting the material after extrusion treatment into a first cracking unit for a first cracking treatment, where temperatures of a first temperature zone, a second temperature zone, a third temperature zone and a fourth temperature zone are controlled at 220° C., 260° C., 320° C. and 380° C. respectively, a feeding speed is 120 g/min, $N_2$ is continuously purged into the furnace through a gas input port in a $N_2$ flow rate of 60 ml/min, and $N_2$ and the gas generated by the first cracking treatment are output by a gas output port and into an absorption unit for absorption;

Bringing the material after first cracking treatment into a second cracking unit for a second cracking treatment, where the furnace is controlled at a temperature of 550° C., the second cracking treatment is performed in a dechlorination agent environment, and the dechlorination agent is the same as that of Example 1-5;

Bringing the treated product into a gas-liquid separator and then collecting a cracked gas and a cracked oil, where a yield of the cracked gas is 13.2%, a total yield of the cracked oil is 60.3%, and chlorine content in the cracked oil is 32 ppm; and fractionating the cracked oil to obtain gasoline fraction, diesel fraction and heavy oil fraction, whose yields and distribution of distillation ranges are shown in Table 1-6.

TABLE 1-6

| | Yield/% | IBP | 10% | 50% | 90% | FBP | Cl/ppm |
|---|---|---|---|---|---|---|---|
| Cracked oil | | 43 | 133 | 301 | 462 | 632 | 32 |
| <180° C. | 16.3% | 52 | 98 | 165 | 175 | 198 | 29 |
| 180° C.-360° C. | 55.9% | 168 | 202 | 285 | 339 | 378 | 34 |
| >360° C. | 27.8% | 349 | 378 | 421 | 506 | 637 | 39 |

Comparative Example 1-1

The present comparative example provides a treatment method for a waste plastic, using the same waste plastic as that of Example 1-5, where the waste plastic is fed into a kettle-type cracking furnace directly after the first pre-treatment to perform a cracking treatment, the furnace is controlled at a temperature of 500° C., and after the treatment is completed, a treated product is obtained.

The treated product then is fed into a gas-liquid separator to collect a cracked gas and cracked oil, a yield of the cracked gas is 19.7%, and a total yield of the cracked oil is 59.3%, in which a yield of a gasoline fraction of <180° C. is 12.1%, a yield of a diesel fraction of 180° C.-360° C. is 49.3% and a yield of a heavy oil fraction of >360° C. is 38.6%, and chlorine content in the cracked oil is 631 ppm.

Comparative Example 1-2

The present comparative example provides a treatment method for a waste plastic, using the same waste plastic as that of Example 1-6, where the waste plastic after the first pre-treatment is input into an extruder for an extrusion treatment, where a temperature of the feeding section is controlled at 150° C., temperatures of compression and melting sections are controlled at 220° C., and the gas discharged during the extrusion process is fed into an absorption unit for absorption.

The material after the extrusion treatment is input into a first cracking unit for a first cracking treatment, the furnace is controlled at a temperature of 230° C. through a heater, a feeding speed is 120 g/min, $N_2$ is continuously purged into the furnace through a gas input port in a $N_2$ flow rate of 60 ml/min, and $N_2$ and the gas generated by the first cracking treatment are output by a gas output port and into an absorption unit for absorption.

The material after first cracking treatment is brought into a second cracking unit for a second cracking treatment, where the furnace is controlled at a temperature of 450° C., and the second cracking unit is not loaded with a dechlorination agent.

The treated product after the second cracking treatment is brought into a gas-liquid separator to collect a cracked gas and a cracked oil, where a yield of the cracked gas is 16.9%, a total yield of the cracked oil is 61.3%, and chlorine content in the cracked oil is 103 ppm.

Comparative Example 1-3

The present comparative example provides an intermittent treating method of a waste plastic. The method uses a kettle-type reactor to raise temperature in stages, and uses the same waste plastic as that of Example 1-7, and specifically includes the following steps:

Placing 200 g of waste plastic after the first pre-treatment into a reactor, raising the temperature to 250° C., keeping the temperature for 3 h, and condensing and storing the resulting gas; performing nitrogen purge on the reactor, then performing a second stage of raising temperature until 300° C., and condensing and storing the gas again; performing nitrogen purge on the reactor again, then adding 50 g of alumina-activated carbon-CuO composite dechlorination agent, raising the temperature to 550° C., and condensing and storing the gas again; and taking the cracked light oil in the condensation storage tank and the cracked oil in the reactor to perform measurement: a yield of the cracked light oil is 34.3%, chlorine content of the cracked light oil is 729 ppm, a yield of the cracked oil is 49.2% and chlorine content of the cracked oil is 68 ppm.

Example 2-1

The present example provides a treatment device, including a first pre-treatment unit, a first mixing unit, a first cracking unit, a second cracking unit, a gas-liquid separation unit, a fractionation unit, an absorption unit and a heating unit. The first pre-treatment unit is used to carry out a first pre-treatment of the waste plastic. The first mixing unit includes a second input port, a third input port and a second output port. The second input port is communicated with an outlet of the first pre-treatment unit, the third input port is communicated with at least one outlet of the fractionation unit, and the second output port is sequentially communicated with the first cracking unit and the second cracking unit, and an outlet of the second cracking unit is communicated with an inlet of the gas-liquid separation unit. The gas-liquid separation unit includes a cracked gas outlet and a cracked oil outlet, and the cracked oil outlet is communicated with an inlet of the fractionation unit. At least one outlet of the fractionation unit is communicated with the third input port, and the heating unit is connected with the first mixing unit, the first cracking unit and the second cracking unit.

The first pre-treatment unit includes a crusher and a sedimentation tank. The crusher is used to crush the waste plastic into plastic sheets or particles of 20-50 mm. The crushed waste plastic is fed into the sedimentation tank, which contains water. Under the action of gravity, the mud and metal impurity on the surface of the waste plastic precipitate to the bottom of the sedimentation tank, and the grease on the upper layer is removed by a film-scraping mode.

The first mixing unit is specifically a dissolving kettle including a stirrer, and the temperature in the dissolving kettle is controlled to be 120-220° C. through the heating unit.

The first cracking unit and the second cracking unit are shown in FIG. 4, and the first cracking unit is provided with a propeller to drive the material forward.

The bottom of the first cracking unit near its inlet is provided with a gas input port, and the upper part thereof near its outlet is provided with a gas output port. The gas input port is communicated with a nitrogen tank to continuously convey nitrogen into the first cracking unit, and the gas output port is communicated with the absorption unit to collect the gas generated during the first cracking treatment process and to convey it into the absorption unit.

The temperature is controlled to be the same everywhere within the first cracking unit through the heating unit.

The second cracking unit is provided with a dechlorination agent reservoir, and a dechlorination agent is stored in the dechlorination agent reservoir. An inner diameter of the dechlorination agent reservoir is D1, and an inner diameter of the second cracking unit is D2, D1/D2 being ½.

The second cracking unit is provided with a scraper and a waste output port. The scraper is used to remove residues left in the second cracking unit and discharge the residues through the waste output port.

Example 2-2

The present example provides a treatment device, which may be referred to Example 2-1, with difference that the cracking unit is shown in FIG. 5, i.e., the first cracking unit and the second cracking unit are two zones of a horizontal reacting furnace.

Example 2-3

The present example provides a treatment device, which may be referred to Example 2-1, with difference that the first cracking unit includes three temperature zones, which are sequentially distributed and arranged along a direction from inlet to outlet of the first cracking unit.

Example 2-4

The present example provides a treatment device, which may be referred to Example 2-2, with difference that the first cracking unit includes four temperature zones, which are sequentially distributed and arranged along a direction from inlet to outlet of the first cracking unit.

Example 2-5

The present example provides a method for continuously treating a waste plastic, using the device provided by Example 2-1. The treatment method specifically includes the following steps:

Using a waste plastic obtained by mixing beverage bottles and disposable plastic bags from household waste, where Cl content of the waste plastic is 3% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 2.1%;

Mixing the dried particles of the waste plastic with the cracked tail oil in a dissolving kettle at atmospheric pressure and 130° C. under stirring to form a first material, inputting the first material into the first cracking unit through a raw material pump to perform a first cracking treatment, where a temperature is controlled at 250° C. through the heating unit, a feeding speed is 100 g/min, $N_2$ is continuously purged into the furnace through a gas input port in a $N_2$ flow rate of 50 ml/min, and $N_2$ and the gas generated by the first cracking treatment are output by a gas output port and into an absorption unit for absorption;

Bringing the material after first cracking treatment into the second cracking unit for a second cracking treatment, where a temperature is controlled at 500° C., the second cracking treatment is performed in a dechlorination agent environment, the dechlorination agent is an alumina-activated carbon-CaO composite dechlorination agent, with a CaO mass content of 10% and a loading amount of 200 g;

Performing gas-liquid separation on the treated product after the second cracking treatment to collect a cracked gas and a cracked oil, where a yield of the cracked gas is 15.3%, chlorine content in the cracked oil is 26 ppm; and fractionating the cracked oil to obtain a gasoline fraction of <180° C., a diesel fraction of 180° C.-360° C. and a tail oil fraction of >360° C., where a total yield of the gasoline fraction and the diesel fraction is 76.4%, the tail oil of >360° C. is returned to the mixing unit and mix it with the waste plastic and then recycled into the cracking furnace again, and the distribution of distillation ranges of the gasoline fraction and the diesel fraction and the chlorine content of them are shown in Table 2-1.

TABLE 2-1

| | IBP (Initial Boiling Point) | 10% | 50% | 90% | FBP (Final Boiling Point) | Cl/ppm |
|---|---|---|---|---|---|---|
| <180° C. | 51 | 76 | 129 | 168 | 192 | 31 |
| 180° C.-360° C. | 168 | 196 | 262 | 349 | 382 | 24 |

Example 2-6

The present example provides a method for continuously treating a waste plastic, using the device provided by Example 2-1. The treatment method specifically includes the following steps:

Using a mixed waste plastic from paper mill, where Cl content of the waste plastic is 6% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 1.8%;

Mixing the dried particles of the waste plastic with the cracked tail oil in a dissolving kettle at atmospheric pressure and 220° C. under stirring to form a first material, inputting the first material into the first cracking unit through a raw material pump to perform a first cracking treatment, where a temperature of the furnace is controlled at 230° C. through the heating unit, a feeding speed is 120 g/min, $N_2$ is continuously purged into the furnace through a gas input port in a $N_2$ flow rate of 60 ml/min, and $N_2$ and the gas generated by the first cracking treatment are output by a gas output port and into an absorption unit for absorption;

Bringing the material after first cracking treatment into a second cracking unit for a second cracking treatment, where a temperature of the furnace is controlled at 450° C., the second cracking treatment is performed in a dechlorination agent environment, and the dechlorination agent is the same as that of Example 2-5;

Performing gas-liquid separation on the treated product after the second cracking treatment to collect a cracked gas and a cracked oil, where a yield of the cracked gas is 20.3%, chlorine content in the cracked oil is 31 ppm; and fractionating the cracked oil to obtain a gasoline fraction of <180° C., a diesel fraction of 180° C.-360° C. and a tail oil fraction of >360° C., where a total yield of the gasoline fraction and the diesel fraction is 77.2%, the tail oil of >360° C. is returned to the mixing unit for mixing with the waste plastic and then is recycled into the cracking furnace again, and the distribution of distillation ranges of the gasoline fraction and the diesel fraction and the chlorine content of them are shown in Table 2-2.

TABLE 2-2

| | IBP | 10% | 50% | 90% | FBP | Cl/ppm |
|---|---|---|---|---|---|---|
| <180° C. | 51 | 76 | 129 | 168 | 192 | 35 |
| 180° C.-360° C. | 168 | 196 | 262 | 349 | 382 | 32 |

Example 2-7

The present example provides a method for continuously treating a waste plastic, using the device provided by Example 2-3. The treatment method specifically includes the following steps:

Using a mixed waste plastic from paper mill, where Cl content of the waste plastic is 4.3% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 2.0%;

Mixing the dried particles of the waste plastic with the cracked tail oil in a dissolving kettle at atmospheric pressure and 180° C. under stirring to form a first material; inputting the first material into the first cracking unit through a raw material pump to perform a first cracking treatment, where temperatures of a first temperature zone, a second temperature zone and a third temperature zone are controlled at 250° C., 300° C. and 350° C. respectively, a feeding speed is 150 g/min, $N_2$ is continuously purged into the furnace through a gas input port in a $N_2$ flow rate of 80 ml/min, and $N_2$ and the gas generated by the first cracking treatment are output by a gas output port and into an absorption unit for absorption;

Bringing the material after first cracking treatment into a second cracking unit for a second cracking treatment, where the furnace is controlled at a temperature of 550° C., the second cracking treatment is performed in a dechlorination agent environment, and the dechlorination agent is the same as that of Example 2-5;

Performing gas-liquid separation on the treated product after the second cracking treatment to collect a cracked gas and a cracked oil, where a yield of the cracked gas is 16.3%, and chlorine content in the cracked oil is 36 ppm; and fractionating the cracked oil to obtain a gasoline fraction of <180° C., a diesel fraction of 180° C.-360° C. and a tail oil fraction of >360° C., where a total yield of the gasoline fraction and the diesel fraction is 80.2%, the tail oil of >360° C. is returned to the mixing unit for mixing with the waste plastic and then is recycled into the cracking furnace again, and the distribution of distillation ranges of the gasoline fraction and the diesel fraction and the chlorine content of them are shown in Table 2-3.

TABLE 2-3

| | IBP | 10% | 50% | 90% | FBP | Cl/ppm |
|---|---|---|---|---|---|---|
| <180° C. | 59 | 72 | 136 | 185 | 202 | 27 |
| 180° C.-360° C. | 187 | 199 | 232 | 355 | 372 | 22 |

Example 2-8

The present example provides a method for continuously treating a waste plastic, using the device provided by Example 2-1, where the temperature in the first cracking unit is set to be 300° C., and all other conditions are the same as those of Example 2-7.

A yield of the collected cracked gas is 15.4%, and chlorine content in the cracked oil is 42 ppm. The cracked oil is fractionated. The distribution of distillation ranges of the gasoline fraction and the diesel fraction obtained by fractionation and the chlorine content of them are shown in Table 2-4. A total yield of the gasoline fraction and the diesel fraction is 78.3%.

TABLE 2-4

| | IBP | 10% | 50% | 90% | FBP | Cl/ppm |
|---|---|---|---|---|---|---|
| <180° C. | 53 | 72 | 129 | 191 | 203 | 35 |
| 180° C.-360° C. | 169 | 197 | 221 | 351 | 381 | 29 |

Example 2-9

The present example provides a method for continuously treating a waste plastic, using the device provided by Example 2-2. The treatment method specifically includes the following steps:

Using a mixed waste plastic from paper mill, where Cl content of the waste plastic is 6.0% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 1.9%;

Mixing the dried particles of the waste plastic with the cracked tail oil in a dissolving kettle at atmospheric pressure and 200° C. under stirring to form a mixed material, which is input into the first cracking unit through a raw material pump to perform a first cracking treatment, where the temperature is controlled at 350° C., a feeding speed is 150 g/min, $N_2$ is continuously purged into the furnace through a gas input port in a $N_2$ flow rate of 100 ml/min, and $N_2$ and the gas generated by the first cracking treatment are output by a gas output port and into an absorption unit for absorption;

Bringing the material after first cracking treatment into a second cracking unit for a second cracking treatment, where the furnace is controlled at a temperature of 550° C., the second cracking treatment is performed in a dechlorination agent environment, and the dechlorination agent is the same as that of Example 2-5;

Performing gas-liquid separation on the treated product after the second cracking treatment to collect a cracked gas and a cracked oil, where a yield of the cracked gas is 15.2%, chlorine content in the cracked oil is 42 ppm; and fractionating the cracked oil to obtain a gasoline fraction of <180° C., a diesel fraction of 180° C.-360° C. and a tail oil fraction of >360° C., where a total yield of the gasoline fraction and the diesel fraction is 82.3%, the tail oil of >360° C. is returned to the mixing unit for mixing with the waste plastic and then is recycled into the cracking furnace again, and the distribution of distillation ranges of the gasoline fraction and the diesel fraction and the chlorine content of them are shown in Table 2-5.

TABLE 2-5

| | IBP | 10% | 50% | 90% | FBP | Cl/ppm |
|---|---|---|---|---|---|---|
| <180° C. | 53 | 77 | 139 | 171 | 201 | 36 |
| 180° C.-360° C. | 165 | 189 | 254 | 360 | 379 | 31 |

Example 2-10

The present example provides a method for continuously treating a waste plastic, using the device provided by Example 2-4, where temperatures of the first temperature zone, the second temperature zone, the third temperature zone and the fourth temperature zone are 240° C., 300° C., 360° C. and 380° C. respectively, and all other conditions are the same as those of Example 2-9.

The yield of the collected cracked gas is 14.3%, and the chlorine content in the cracked oil is 33 ppm. The cracked oil is fractionated. The distribution of distillation ranges of the gasoline and diesel fractions obtained by fractionation and the chlorine content of them are shown in Table 2-6. A total yield of the gasoline fraction and the diesel fraction is 80.5%.

TABLE 2-6

| | IBP | 10% | 50% | 90% | FBP | Cl/ppm |
|---|---|---|---|---|---|---|
| <180° C. | 59 | 77 | 135 | 169 | 198 | 29 |
| 180° C.-360° C. | 175 | 192 | 239 | 342 | 367 | 26 |

Comparative Example 2-1

The present comparative example provides a treatment method for a waste plastic, using the same waste plastic as that of Example 2-5. The waste plastic is fed into a kettle-type cracking furnace directly after the first pre-treatment to perform a cracking treatment, where the furnace is controlled at a temperature of 500° C., and after the treatment is completed, a treated product is obtained.

The treated product is fed into a gas-liquid separator to collect a cracked gas and cracked oil, where a yield of the cracked gas is 19.7%, a total yield of the cracked oil is 59.3%, in which a yield of the gasoline fraction of <180° C. is 12.1%, a yield of the diesel fraction of 180° C.-360° C. is 49.3% and a yield of the tail oil fraction of >360° C. is 38.6%, and chlorine content in the cracked oil is 631 ppm.

Comparative Example 2-2

The present comparative example provides a treatment method for a waste plastic, using the same waste plastic and first pre-treatment method as those of Example 2-5. The waste plastic after the first pre-treatment is input into an extruder for a melting extrusion treatment, where a temperature of the feeding section is controlled at 130° C. and temperatures of compression and melting sections are controlled at 200° C.

The material after melting extrusion treatment which is input into the first cracking unit for a first cracking treatment, where the furnace is controlled at a temperature of 250° C. through a heater, a feeding speed is 100 g/min, $N_2$ is continuously purged into the furnace through a gas input port in a $N_2$ flow rate of 50 ml/min, and $N_2$ and the gas generated by the first cracking treatment are output by a gas output port and into an ab sorption unit for absorption.

The material after first cracking treatment is fed into a second cracking unit for a second cracking treatment, where the furnace is controlled at a temperature of 500° C., the second cracking treatment is performed in a dechlorination agent environment, and the dechlorination agent is the same as that of Example 2-5.

The treated product after the second cracking treatment is fed into a gas-liquid separator to collect a cracked gas and cracked oil, where a yield of the cracked gas is 13.9%, a total yield of the cracked oil is 66.7%, and chlorine content in the cracked oil is 23 ppm.

Example 3-1

The present example provides a treatment device, including a first pre-treatment unit, a second mixing unit, an absorption unit, a first cracking unit, a second cracking unit, and a heating unit. The first pre-treatment unit is used to carry out a first pre-treatment on waste plastic. The second mixing unit includes a fourth input port, a fifth input port and a third output port, where the fourth input port is communicated with an outlet of the first pre-treatment unit, the fifth input port is used for inputting a heavy oil, and the third output port is sequentially communicated with the first cracking unit and the second cracking unit. An outlet of the second cracking unit may be connected to other separation unit for gas-liquid separation or fraction fractionation, or may be directly connected to a downstream processing unit. The heating unit is connected with the second mixing unit, the first cracking unit and the second cracking unit.

The first pre-treatment unit includes a crusher and a sedimentation tank. The crusher is used to crush the waste plastic into plastic sheets or particles of 20-50 mm. The crushed waste plastic is fed into the sedimentation tank, which contains water. Under the action of gravity, the mud and metal impurity on the surface of the waste plastic precipitate to the bottom of the sedimentation tank, and the grease on the upper layer is removed by a film-scraping mode.

The second mixing unit is specifically a dissolving kettle including a stirrer, and the dissolving kettle is controlled at a temperature of 120-220° C. through the heating unit.

The first cracking unit is provided with a propeller to drive the material forward.

The bottom of the first cracking unit near its inlet is provided with a gas input port, and the upper part thereof near its outlet is provided with a gas output port. The gas input port is communicated with a nitrogen tank to continuously convey nitrogen into the first cracking unit, and the gas output port is communicated with the absorption unit to collect the gas generated during the first cracking treatment process and convey it into the absorption unit.

The temperature in the first cracking unit is controlled to be the same everywhere through the heating unit.

The second cracking unit is provided with a dechlorination agent reservoir, and a dechlorination agent is stored in the dechlorination agent reservoir. An inner diameter of the dechlorination agent reservoir is D1, and an inner diameter of the second cracking unit is D2, D1/D2 being ½.

The second cracking unit is provided with a scraper and a waste output port. The scraper is used to remove residues left in the second cracking unit and discharge the residues through the waste output port.

Example 3-2

The present example provides a treatment device, which may be referred to Example 3-1, with difference that the first cracking unit includes three temperature zones, which are sequentially distributed and arranged along a direction from inlet to outlet of the first cracking unit.

Example 3-3

The present example provides a treatment method for a waste plastic and a heavy oil, using the device provided by Example 3-1. The treatment method specifically includes the following steps:

Using a waste plastic obtained by mixing beverage bottles and disposable plastic bags from household waste, where Cl content of the waste plastic is 0.5% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 2.1%;

Mixing the particles of the waste plastic and a heavy oil (vacuum wax oil, the distillation range is shown in Table 3-1) in a mass ratio of 1:10 in a dissolving kettle at atmospheric pressure and 120° C. under stirring to form a first slurry, which is input into the first cracking unit through a raw material pump to perform a first cracking treatment, where the furnace is controlled at a temperature of 250° C., a feeding speed is 100 g/min, $N_2$ is continuously purged into the furnace through a gas input port in a $N_2$ flow rate of 50 ml/min, and $N_2$ and the gas generated by the first cracking treatment are output by a gas output port and into an absorption unit for absorption;

Feeding the slurry after first cracking treatment into the second cracking unit for a second cracking treatment, where the temperature is controlled at 480° C., the second cracking treatment is performed in a dechlorination agent environment, and the dechlorination agent is an alumina-activated carbon-CaO composite dechlorination agent with a CaO mass content of 10% and a loading amount of 200 g;

Performing gas-liquid separation on the treated product after the second cracking treatment to collect a cracked oil, and fractionating the cracked oil to obtain a gasoline fraction of <180° C., a diesel fraction of 180° C.-360° C. and a tail oil fraction of >360° C., where yield, distillation range and chlorine content of each fraction are shown in Table 3-1, the yield of cracked oil is a mass ratio of the cracked oil to feedstock, and the yields of the gasoline fraction, diesel fraction, and tail oil fraction are mass proportions of respective fractions in the cracked oil.

TABLE 3-1

| | Yield/ % | IBP (Initial Boiling Point) | 10% | 50% | 90% | FBP (Final Boiling Point) | Cl/ ppm |
|---|---|---|---|---|---|---|---|
| Vacuum wax oil | | 349 | 357 | 441 | 473 | 484 | |
| Cracked oil | 94.6 | 53 | 119 | 267 | 432 | 533 | 10 |
| <180° C. | 30.6 | 36 | 102 | 155 | 177 | 202 | 15 |
| 180° C.-360° C. | 50.3 | 169 | 209 | 272 | 368 | 399 | 6 |
| >360° C. | 19.1 | 323 | 369 | 469 | 539 | 603 | 5 |

Example 3-4

The present example provides a method for continuously treating a waste plastic and heavy oil, using the device provided by Example 3-1. The treatment method specifically includes the following steps:

Using a waste plastic obtained by mixing disposable plastic bags and plastic beverage bottles with lids removed from household waste, where Cl content of the waste plastic is 1.2% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 1.8%;

Mixing the particles of the waste plastic with the heavy oil (vacuum wax oil, same as that of Example 3-3) in a mass ratio of 1:20 in a dissolving kettle at atmospheric pressure and 120° C. under stirring to form a first slurry, which is input into the first cracking unit through a raw material pump to perform a first cracking treatment, where the furnace is controlled at a temperature of 300° C., a feeding speed is 80 g/min, $N_2$ is continuously purged into the furnace through a gas input port in a $N_2$ flow rate of 60 ml/min, and $N_2$ and the gas generated by the first cracking treatment are output by a gas output port and into an absorption unit for absorption;

Feeding the slurry after first cracking treatment into the second cracking unit for a second cracking treatment, where the furnace is controlled at a temperature of 480° C., the second cracking treatment is performed in a dechlorination agent environment, and the dechlorination agent is the same as that of Example 3-3;

Performing gas-liquid separation on the treated product after the second cracking treatment to collect a cracked oil, and fractionating the cracked oil to obtain a gasoline fraction of <180° C., a diesel fraction of 180° C.-360° C. and a tail oil fraction of >360° C., where yield, distillation range and chlorine content of each fraction are shown in Table 3-2, the yield of the cracked oil is a mass ratio of the cracked oil to feedstock, and the yields of the gasoline fraction, diesel fraction and tail oil fraction are mass proportions of respective fractions in the cracked oil.

TABLE 3-2

| | Yield/% | IBP | 10% | 50% | 90% | FBP | Cl/ppm |
|---|---|---|---|---|---|---|---|
| Cracked oil | 92.9 | 47 | 136 | 284 | 452 | 496 | 3 |
| <180° C. | 33.7 | 42 | 129 | 153 | 169 | 199 | 4 |
| 180° C.-360° C. | 51.6 | 124 | 206 | 305 | 356 | 402 | 1 |
| >360° C. | 14.7 | 306 | 372 | 402 | 466 | 522 | 1 |

Example 3-5

The present example provides a treatment method for a waste plastic and a heavy oil, using the device provided by Example 3-1. The treatment method specifically includes the following steps:

Using a waste plastic same as that of Example 3-4, and mixing the waste plastic and the heavy oil (vacuum wax oil, same as that of Example 3-3) in a mass ratio of 2:1 in a dissolving kettle at atmospheric pressure and 120° C. under stirring to form a first slurry, which is input into the first cracking unit through a raw material pump to perform a first cracking treatment, where the furnace is controlled at a temperature of 280° C., a feeding speed is 100 g/min, $N_2$ is continuously purged into the furnace through a gas input port in a $N_2$ flow rate of 50 ml/min, and $N_2$ and the gas generated by the first cracking treatment are output by a gas output port and into an absorption unit for absorption;

Feeding the slurry after first cracking treatment into the second cracking unit for a second cracking treatment, where the furnace is controlled at a temperature of 500° C., the second cracking treatment is performed in a dechlorination agent environment, and the dechlorination agent is the same as that of Example 3-3;

Performing gas-liquid separation on the treated product after the second cracking treatment to collect a cracked oil, and fractionating the cracked oil to obtain a gasoline fraction of <180° C., a diesel fraction of 180° C.-360° C. and a tail oil fraction of >360° C., where yield, distillation range and chlorine content of each fraction are shown in Table 3-3, the yield of the cracked oil is a mass ratio of the cracked oil to feedstock, and the yields of the gasoline fraction, diesel fraction, and tail oil fraction are the mass proportions of respective fractions in the cracked oil.

TABLE 3-3

| | Yield/% | IBP | 10% | 50% | 90% | FBP | Cl/ppm |
|---|---|---|---|---|---|---|---|
| Cracked oil | 79.6 | 39 | 82 | 305 | 452 | 496 | 19 |
| <180° C. | 22.3 | 36 | 69 | 139 | 162 | 199 | 22 |
| 180° C.-360° C. | 49.8 | 166 | 202 | 262 | 335 | 368 | 16 |
| >360° C. | 27.9 | 342 | 382 | 406 | 472 | 502 | 9 |

Example 3-6

The present example provides a treatment method for a waste plastic and a heavy oil, using the device provided by Example 3-2, where the temperatures of the first temperature zone, the second temperature zone and the third temperature zone in the first cracking unit are set to be 250° C., 280° C. and 300° C. respectively, and all other conditions are the same as those of Example 3-5.

Gas-liquid separation are performed on the treated product after the second cracking treatment to collect a cracked oil, and the cracked oil is fractionated to obtain a gasoline fraction of <180° C., a diesel fraction of 180° C.-360° C. and a tail oil fraction of >360° C. Yield, distillation range and chlorine content of each fraction are shown in Table 3-4. The yield of the cracked oil is a mass ratio of the cracked oil to feedstock, and the yields of the gasoline fraction, diesel fraction, and tail oil fraction are mass proportions of respective fractions in the cracked oil.

TABLE 3-4

| | Yield/% | IBP | 10% | 50% | 90% | FBP | Cl/ppm |
|---|---|---|---|---|---|---|---|
| Cracked oil | 80.2 | 41 | 79 | 322 | 437 | 501 | 15 |
| <180° C. | 22.6 | 34 | 65 | 135 | 167 | 204 | 17 |
| 180° C.-360° C. | 50.2 | 181 | 214 | 271 | 342 | 365 | 13 |
| >360° C. | 27.2 | 355 | 391 | 410 | 466 | 498 | 7 |

Example 3-7

The present example provides a treatment method for a waste plastic and a heavy oil, using the device provided by Example 3-1. The treatment method specifically includes the following steps:

Using a mixed waste plastic from paper mill, where Cl content of the waste plastic is 4.0% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer to obtain a waste plastic with a moisture content of 1.9%;

Mixing the particles of the waste plastic and the heavy oil (vacuum wax oil, distillation range is shown in Table 3-5) in a mass ratio of 5:1 in a dissolving kettle at atmospheric pressure and 120° C. under stirring to form a first slurry, which is input into the first cracking unit through a raw material pump to perform a first cracking treatment, where the furnace is controlled at a temperature of 230° C., a feeding speed is 80 g/min, $N_2$ is continuously purged into the furnace through a gas input port in a $N_2$ flow rate of 50 ml/min, and $N_2$ and the gas generated by the first cracking treatment are output by a gas output port and into an absorption unit for absorption;

Feeding the slurry after first cracking treatment into the second cracking unit for a second cracking treatment, where the furnace is controlled at a temperature of 520° C., the second cracking treatment is performed in a dechlorination agent environment, and the dechlorination agent is the same as that of Example 3-3;

Performing gas-liquid separation on the treated product after the second cracking treatment to collect a cracked oil, and fractionating the cracked oil to obtain a gasoline fraction of <180° C., a diesel fraction of 180° C.-360° C. and a tail oil fraction of >360° C., where yield, distillation range and chlorine content of each fraction are shown in Table 3-5, the yield of the cracked oil is a mass ratio of the cracked oil to feedstock, and yields of the gasoline fraction, diesel fraction, and tail oil fraction are mass proportions of respective fractions in the cracked oil.

TABLE 3-5

| | Yield/ % | IBP | 10% | 50% | 90% | FBP | Cl/ ppm |
|---|---|---|---|---|---|---|---|
| Residual oil fraction | | 454 | 546 | 667 | 710 | — | — |
| Cracked oil | 62.4 | 42 | 102 | 296 | 466 | 503 | 35 |
| <180° C. | 18.6 | 36 | 76 | 124 | 172 | 183 | 42 |
| 180° C.-360° C. | 48.2 | 124 | 216 | 239 | 342 | 402 | 29 |
| >360° C. | 33.2 | 301 | 402 | 433 | 462 | 499 | 26 |

Example 3-8

The present example provides a treatment method for a waste plastic and a heavy oil, using the device provided by Example 3-2, where temperatures of the first temperature zone, the second temperature zone and the third temperature zone are set at 240° C., 300° C. and 360° C. respectively, and all other conditions are the same as those of Example 3-7.

Gas-liquid separation on the treated product after the second cracking treatment are performed to collect a cracked oil, and the cracked oil is fractionated to obtain a gasoline fraction of <180° C., a diesel fraction of 180° C.-360° C. and a tail oil fraction of >360° C., where yield, distillation range and chlorine content of each fraction are shown in Table 3-6, the yield of the cracked oil is a mass ratio of the cracked oil to feedstock, and the yields of the gasoline fraction, diesel fraction, and tail oil fraction are mass proportions of respective fractions in the cracked oil.

TABLE 3-6

| | Yield/% | IBP | 10% | 50% | 90% | FBP | Cl/ppm |
|---|---|---|---|---|---|---|---|
| Cracked oil | 62.5 | 44 | 106 | 301 | 479 | 533 | 27 |
| <180° C. | 17.5 | 35 | 72 | 133 | 185 | 202 | 31 |
| 180° C.-360° C. | 46.3 | 153 | 214 | 252 | 344 | 385 | 22 |
| >360° C. | 36.2 | 295 | 384 | 429 | 455 | 519 | 19 |

Example 3-9

The present example provides a treatment method for a waste plastic and a heavy oil, using the device provided by Example 3-1. The treatment method specifically includes the following steps:

Using a mixed waste plastic from paper mill, where Cl content of the waste plastic is 6.0% as determined through a combustion-microcoulometry method;

Crushing the waste plastic into particles with a particle diameter of less than 50 mm using a laboratory small freezer crusher, washing the crushed particles of the waste plastic in an ultrasonic cleaning machine, and after precipitation and removal of impurity, drying with a cyclone dryer;

Mixing the particles of the waste plastic and the residual oil (same as that of Example 3-7) in a mass ratio of 10:1 in a dissolving kettle at atmospheric pressure and 120° C. under stirring to form a mixed slurry, which is input into the first cracking unit through a raw material pump to perform a first cracking treatment, where the temperature is controlled at 350° C., a feeding speed is 80 g/min, $N_2$ is continuously purged into the furnace through a gas input port in a $N_2$ flow rate of 50 ml/min, and $N_2$ and the gas generated by the first cracking treatment are output by a gas output port and into an absorption unit for absorption;

Feeding the slurry after first cracking treatment into the second cracking unit for a second cracking treatment, where the furnace is controlled at a temperature of 500° C., the second cracking treatment is performed in a dechlorination agent environment, and the dechlorination agent is the same as that of Example 3-3;

Performing gas-liquid separation on the treated product after the second cracking treatment to collect a cracked oil, and the cracked oil is fractionated to obtain a gasoline fraction of <180° C., a diesel fraction of 180° C.-360° C. and a tail oil fraction of >360° C., where yield, distillation range and chlorine content of each fraction are shown in Table 3-7, the yield of the cracked oil is a mass ratio of the cracked oil to feedstock, and the yields of the gasoline fraction, diesel fraction, and tail oil fraction are mass proportions of respective fractions in the cracked oil.

TABLE 3-7

| | Yield/% | IBP | 10% | 50% | 90% | FBP | Cl/ppm |
|---|---|---|---|---|---|---|---|
| Cracked oil | 67.3 | 42 | 102 | 296 | 466 | 503 | 42 |
| <180° C. | 24.3 | 39 | 57 | 154 | 177 | 202 | 47 |
| 180° C.-360° C. | 52.7 | 162 | 192 | 269 | 352 | 378 | 39 |
| >360° C. | 23.0 | 294 | 369 | 449 | 477 | 501 | 36 |

Example 3-10

The present example provides a treatment method for a waste plastic and a heavy oil, using the device provided by Example 3-2, where temperatures of the first temperature zone, the second temperature zone and the third temperature zone are set at 250° C., 300° C. and 350° C. respectively, and all other conditions are the same as those of Example 3-9.

Gas-liquid separation on the treated product after the second cracking treatment are performed to collect a cracked oil, and the cracked oil is fractionated to obtain a gasoline fraction of <180° C., a diesel fraction of 180° C.-360° C. and a tail oil fraction of >360° C., where yield, distillation range and chlorine content of each fraction are shown in Table 3-8, the yield of the cracked oil is a mass ratio of the cracked oil to feedstock, and the yields of the gasoline fraction, diesel fraction, and tail oil fraction are mass proportions of respective fractions in the cracked oil.

TABLE 3-8

| | Yield/% | IBP | 10% | 50% | 90% | FBP | Cl/ppm |
|---|---|---|---|---|---|---|---|
| Cracked oil | 65.9 | 40 | 111 | 307 | 459 | 529 | 31 |
| <180° C. | 24.1 | 45 | 58 | 155 | 189 | 209 | 35 |
| 180° C.-360° C. | 53.5 | 159 | 201 | 278 | 365 | 382 | 27 |
| >360° C. | 22.4 | 332 | 359 | 467 | 499 | 512 | 22 |

Example 3-11

The present example provides a treatment method for a waste plastic and a heavy oil, using the device provided by Example 3-1. The treatment method specifically includes the following steps:

Using a mixed waste plastic from paper mill and household garbage, where Cl content of the waste plastic is 5.2% as determined through a combustion-microcoulometry method; and after washing and drying, freezing and crushing it into powder particles;

Mixing the particles of the waste plastic and a hydrocracked tail oil (distillation range is shown in Table 3-9) in a mass ratio of 1:1 in a dissolving kettle at atmospheric pressure and 130° C. under stirring to form a first slurry, which is input into the first cracking unit through a raw material pump to perform a first cracking treatment, where the furnace is controlled at a temperature of 280° C., a feeding speed is 80 g/min, $N_2$ is continuously purged into the furnace through a gas input port in a $N_2$ flow rate of 50 ml/min, and $N_2$ and the gas generated by the first cracking treatment are output by a gas output port and into an absorption unit for absorption;

Feeding the slurry after first cracking treatment into the second cracking unit to perform a second cracking treatment, where the furnace is controlled at a temperature of 530° C., the second cracking treatment is performed in a dechlorination agent environment, and the dechlorination agent is the same as that of Example 3-3;

Performing gas-liquid separation on the treated product after the second cracking treatment to collect a cracked oil, and the cracked oil is fractionated to obtain a gasoline fraction of <180° C., a diesel fraction of 180° C.-360° C. and a tail oil fraction of >360° C., where yield, distillation range and chlorine content of each fraction are shown in Table 3-9, the yield of the cracked oil is a mass ratio of the cracked oil to feedstock, and the yields of the gasoline fraction, diesel fraction, and tail oil fraction are mass proportions of respective fractions in the cracked oil.

TABLE 3-9

| | Yield/ % | IBP | 10% | 50% | 90% | FBP | Cl/ ppm |
|---|---|---|---|---|---|---|---|
| Hydrocracked tail oil | / | 39 | 122 | 306 | 453 | 523 | / |
| Cracked oil | 71.2 | 39 | 122 | 306 | 453 | 523 | 23 |
| <180° C. | 19.7 | 36 | 54 | 149 | 168 | 197 | 37 |
| 180° C.-360° C. | 45.9 | 159 | 189 | 305 | 349 | 366 | 19 |
| >360° C. | 34.4 | 324 | 359 | 407 | 457 | 523 | 19 |

Comparative Example 3-1

The present comparative example provides a treatment method for a waste plastic, using the same waste plastic as that of Example 3-5, where the waste plastic is fed into a kettle-type cracking furnace directly after the first pre-treatment to perform a cracking treatment, the furnace is controlled at a temperature of 500° C. and after the treatment is completed, a treated product is obtained.

The treated product is fed into the gas-liquid separator to collect a cracked oil, where a total yield of the cracked gas is 76.3%, in which a yield of a gasoline fraction of <180° C. is 18.6%, a yield of a diesel fraction of 180° C.-360° C. is 48.2% and a yield of a heavy oil fraction of >360° C. is 23.2%, and chlorine content in the cracked oil is 327 ppm.

Comparative Example 3-2

The present comparative example provides a treatment method for a waste plastic, using the same waste plastic and a first pre-treatment method as those of Example 3-5, where the waste plastic after the first pre-treatment is input into the extruder for a melting extrusion treatment, a temperature of the feeding section is controlled at 130° C. and temperatures of compression and melting sections are controlled at 200° C.

The slurry after the melting extrusion treatment is input into the first cracking unit for a first cracking treatment, where the furnace is controlled at a temperature of 280° C., a feeding speed is 100 g/min, $N_2$ is continuously purged into the furnace through a gas input port in a $N_2$ flow rate of 50 ml/min, and $N_2$ and the gas generated by the first cracking treatment are output by a gas output port and into an absorption unit for absorption.

The slurry after the first cracking treatment is fed into the second cracking unit for a second cracking treatment, where the furnace is controlled at a temperature of 500° C., the second cracking treatment is performed in a dechlorination agent environment, and the dechlorination agent is the same as that of Example 3-3.

Gas-liquid separation on the treated product after the second cracking treatment is performed to collect a cracked oil, and the cracked oil is fractionated to obtain a gasoline fraction of <180° C., a diesel fraction of 180° C.-360° C. and a tail oil fraction of >360° C., where yield, distillation range and chlorine content of each fraction are shown in Table 3-10, the yield of the cracked oil is a mass ratio of the cracked oil to feedstock, and the yields of the gasoline fraction, diesel fraction and tail oil fraction are mass proportions of respective fractions in the cracked oil.

TABLE 3-10

| | Yield/% | IBP | 10% | 50% | 90% | FBP | Cl/ppm |
|---|---|---|---|---|---|---|---|
| Cracked oil | 69.7 | 47 | 123 | 292 | 499 | 601 | 46 |
| <180° C. | 23.1 | 36 | 129 | 166 | 179 | 207 | 55 |
| 180° C.-360° C. | 55.4 | 163 | 187 | 262 | 342 | 382 | 42 |
| >360° C. | 21.5 | 305 | 315 | 419 | 557 | 613 | 33 |

Finally, it should be noted that the above examples are only used to illustrate the technical solutions of the present application, but not to limit them; although the present application has been described in detail with reference to the aforementioned examples, it should be understood by persons skilled in the art that the technical solutions recorded in the aforementioned examples may still be modified or some or all of the technical features therein may be equivalently replaced; while these modifications or replacements do not make the essence of the corresponding technical solutions depart from the scope of the technical solutions of various embodiments of the present application.

What is claimed is:

1. A treatment method for a waste plastic, using a first pre-treatment unit, a second pre-treatment unit, a first cracking unit and a second cracking unit, wherein the second pre-treatment unit, the first cracking unit and the second cracking unit are sequentially communicated, the first cracking unit comprises a gas input port and a gas output port, and the second cracking unit is loaded with a dechlorination agent, the treatment method comprising the following steps:

inputting the waste plastic into the first pre-treatment unit for a first pre-treatment to remove impurity and grease on a surface of the waste plastic, and inputting the waste plastic after the first pre-treatment into the second pre-treatment unit for a second pre-treatment to obtain a first material in flow state;

inputting the first material into the first cracking unit for a first cracking treatment, the first cracking treatment being performed under anaerobic condition, inputting a protective gas into the first cracking unit through the gas input port to purge the first material, and discharging a gas during the first cracking treatment through the gas output port, where the first cracking unit has a temperature of 220-380° C., and at least includes two temperature zones, a temperature of one temperature zone near a material input port side is lower than a temperature of another temperature zone near a material output port side, and a temperature difference between two adjacent temperature zones is not less than 20° C.; and inputting a second material output from the first cracking unit into the second cracking unit for a second cracking treatment, to obtain a treated product, where the second cracking unit has a temperature of 450-600° C.

2. The treatment method according to claim 1, wherein the second pre-treatment unit is an extrusion unit, and the extrusion unit comprises a first input port, a first output port and an exhaust port; the first input port is used for inputting the waste plastic after the first pre-treatment, the first output port is communicated with the input port of the first cracking unit, and the exhaust port is used for discharging a gas generated in the second pre-treatment;

the treatment method further comprising:

inputting the waste plastic after the first pre-treatment into the extrusion unit through the first input port to perform an extrusion treatment, and discharging a gas generated in the extrusion treatment through the exhaust port.

3. The treatment method according to claim 2, wherein a content of PVC in the waste plastic is not higher than 20%.

4. The treatment method according to claim 2, wherein a temperature of the second pre-treatment unit is 120-220° C.

5. The treatment method according to claim 1, wherein the second pre-treatment unit is a first mixing unit, the first mixing unit comprises a second input port, a third input port and a second output port, the second input port is used for inputting the waste plastic after the first pre-treatment, and the third input port is used for inputting a cracked tail oil, the second output port is communicated with the input port of the first cracking unit, an output port of the second cracking unit is communicated with an input port of a gas-liquid separation unit, an output port of the gas-liquid separation unit is communicated with an input port of a fractionation unit, and at least one output port of the fractionation unit is communicated with the third input port;

the treatment method further comprising: inputting the treated product obtained after the second cracking treatment into the gas-liquid separation unit for a gas-liquid separation to collect a liquid material, inputting the liquid material into the fractionation unit for a fractionation treatment, returning a cracked tail oil obtained after the fractionation treatment to the first mixing unit through the third input port to mix with the waste plastic after the first pre-treatment.

6. The treatment method according to claim 5, wherein a fractionating temperature of the cracked tail oil is 300-500° C.

7. The treatment method according to claim 1, wherein the second pre-treatment unit is a second mixing unit, the second mixing unit comprises a fourth input port, a fifth input port and a third output port, the fourth input port is used for inputting the waste plastic after the first pre-treatment, and the fifth input port is used for inputting a heavy oil, and the third output port is communicated with the input port of the first cracking unit.

8. The treatment method according to claim 7, wherein the heavy oil comprises one or more of residual oil fractions above 500° C., vacuum wax oil above 350° C., hydrocracked tail oil, and catalytic cracked heavy cycle oil.

9. The treatment method according to claim 1, wherein a content of PVC in the waste plastic is not higher than 20%.

10. The treatment method according to claim 1, wherein a temperature of the second pre-treatment unit is 120-220° C.

11. The treatment method according to claim 1, wherein the gas discharged in a process of the first cracking treatment is input into an absorption liquid, and the absorption liquid has a pH of ≥7.

12. The treatment method according to claim 1, wherein the dechlorination agent comprises a carrier matrix and a metal oxide, the carrier matrix is one or more of alumina, activated carbon and molecular sieve, and the metal oxide is one or more of CuO, CaO, MgO and $Fe_2O_3$.

13. The treatment method according to claim 12, wherein a mass of the metal oxide is 1%-10% of a total mass of the dechlorination agent.

14. A device for implementing the treatment method according to claim 1, wherein the device comprises a first pre-treatment unit, a second pre-treatment unit, a first cracking unit, a second cracking unit and a heating unit, wherein the first pre-treatment unit is used for performing the first pre-treatment on the waste plastic to remove impurity and grease on a surface of the waste plastic; the second pre-treatment unit comprises an input port and an output port, the input port is used for inputting the waste plastic after the first pre-treatment, the output port is communicated with the input port of the first cracking unit, the output port of the first cracking unit is communicated with an input port of the second cracking unit, and an output port of the second cracking unit is used for outputting the treated product;

the first cracking unit is provided with a material conveyor, a gas input port and a gas output port, the material conveyor is used for conveying a material in the first cracking unit to the output port; the gas input port is used for conveying a protective gas into the first cracking unit, and the gas output port is used for discharging a gas from the first cracking treatment;

the second cracking unit is provided with a dechlorination agent reservoir, in which a dechlorination agent is stored; and the heating unit is used for controlling temperatures in the first cracking unit and the second cracking unit, and enables the first cracking unit to comprise at least two temperature zones.

15. The device according to claim 14, wherein the second pre-treatment unit is an extrusion unit, the extrusion unit comprises a first input port, a first output port and an exhaust port; the first input port is used for inputting the waste plastic after the first pre-treatment, the first output port is communicated with the input port of the first cracking unit, and the exhaust port is used for discharging the gas generated in the second pre-treatment.

16. The device according to claim 14, wherein the second pre-treatment unit is a first mixing unit, and the device further comprises a gas-liquid separation unit and a fractionation unit;

the first mixing unit comprises a second input port, a third input port and a second output port, the second input port is used for inputting the waste plastic after the first pre-treatment, the third input port is used for inputting a cracked tail oil, and the second output port is communicated with the input port of the first cracking unit; the output port of the second cracking unit is communicated with an input port of the gas-liquid separation unit, an output port of the gas-liquid separation unit is communicated with an input port of the fractionation unit, and at least one output port of the fractionation unit is communicated with the third input port.

17. The device according to claim 14, wherein the second pre-treatment unit is a second mixing unit, and the second mixing unit comprises a fourth input port, a fifth input port and a third output port, the fourth input port is used for inputting the waste plastic after the first pre-treatment, the fifth input port is used for inputting a heavy oil, and the third output port is communicated with the input port of the first cracking unit.

18. The device according to claim 14, wherein an inner diameter of the dechlorination agent reservoir is D1, an inner diameter of the second cracking unit is D2, $\frac{1}{2} \leq D1/D2 \leq \frac{2}{3}$.

19. The device according to claim 14, wherein the second cracking unit is further provided with a cleaner and a waste output port, wherein the cleaner is arranged on an inner wall of the second cracking unit, and the waste output port is used for discharging a waste residue generated in the second cracking treatment.

20. The device according to claim 14, wherein the device further comprises an absorption unit which is communicated with the gas output port of the first cracking unit.

* * * * *